US011394875B2

(12) United States Patent
Zavesky et al.

(10) Patent No.: US 11,394,875 B2
(45) Date of Patent: Jul. 19, 2022

(54) CONTENT CAPTURE SERVICE

(71) Applicants: AT&T Intellectual Property I, L.P., Atlanta, GA (US); AT&T Mobility II LLC, Atlanta, GA (US)

(72) Inventors: Eric Zavesky, Austin, TX (US); Lee Begeja, Gillette, NJ (US); David Crawford Gibbon, Lincroft, NJ (US); Jean-Francois Paiement, Sausalito, CA (US); Tan Xu, Bridgewater, NJ (US); Terrel Lecesne, Round Rock, TX (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 59 days.

(21) Appl. No.: 16/710,125

(22) Filed: Dec. 11, 2019

(65) Prior Publication Data

US 2021/0185222 A1 Jun. 17, 2021

(51) Int. Cl.
*H04N 5/232* (2006.01)
*H04N 5/222* (2006.01)

(52) U.S. Cl.
CPC ....... *H04N 5/23222* (2013.01); *H04N 5/2228* (2013.01); *H04N 5/23245* (2013.01); *H04N 5/232935* (2018.08); *H04N 5/232939* (2018.08)

(58) Field of Classification Search
CPC ............. H04N 5/23222; H04N 5/2228; H04N 5/232935; H04N 5/232939; H04N 5/23245; H04N 5/23225; H04N 5/232933; H04N 5/23216
See application file for complete search history.

(56) References Cited

U.S. PATENT DOCUMENTS

| | | | | |
|---|---|---|---|---|
| 9,171,015 B2 * | 10/2015 | Byers | ...................... | H04L 67/06 |
| 10,261,600 B2 * | 4/2019 | Ishimoto | .................. | G06T 7/20 |
| 10,521,878 B1 * | 12/2019 | Medina, III | ............. | G06T 1/20 |
| 2017/0294212 A1 * | 10/2017 | Allen | ..................... | G11B 27/34 |
| 2019/0205635 A1 * | 7/2019 | Brown | .............. | G06K 9/00463 |

OTHER PUBLICATIONS

Github, "MELD: A Multimodal Multi-Party Dataset for Emotion Recognition in Conversation," retrieved at https://github.com/SenticNet/MELD on Oct. 31, 2019, GitHub, Inc., 2019.

* cited by examiner

*Primary Examiner* — Luong T Nguyen
(74) *Attorney, Agent, or Firm* — Hartman & Citrin LLC

(57) ABSTRACT

Concepts and technologies are disclosed herein for a content capture application and/or service. In one example embodiment, an application/service can determine a project definition for a media project that can include a video that is to be captured via a user device having a camera. The application/service can determine a device capability of the user device including a video capability and a networking capability. The application/service can determine, based on the project definition and the device capability, a capture suggestion. The capture suggestion can include instructions relating to content to be included in the video. The device can provide the capture suggestion to the user device, obtain media content based on the video, assemble the media project including the media content, and output the media project to a recipient.

20 Claims, 20 Drawing Sheets

100
132B
PROJECT 136
RECIPIENT 138
PROJECT 136
132C
DEVICE TABLE 144
USER DEVICE
OS 106
CONTENT CAPTURE APPLICATION 108
102
122
NETWORK 104
SERVER COMPUTER
CONTENT CAPTURE SERVICE 110
112
134
PROJECT DATA
PROJECT DEFINITIONS 116
PROJECT DEFINITION DATA 118
DEVICE CAPABILITIES 120
CAPTURE SUGGESTIONS 122
USER INPUT DATA 124
MEDIA CONTENT 126
MODIFIED MEDIA CONTENT 128
OTHER INFORMATION 130
114
132A
132A
NETWORK MONITOR 140
NETWORK DATA 142

500E

CONTENT CAPTURE SERVICE

BACKGROUND

Many modern user devices include camera functionality, and over the years some hardware manufacturers have begun to rely on the camera functionality of the user devices to differentiate their devices from devices of their competitors. As a result, the quality of cameras included on some user devices continues to improve and the sharing of video and/or camera images has become commonplace.

Similarly, media content is often consumed on a wide array of devices that can have varied displays (e.g., varied in terms of display size, display resolution, display aspect ratio, etc.); varied communication capabilities (e.g., upload capabilities, download capabilities, streaming capabilities, etc.); varied audio capabilities (e.g., output volume, connection capabilities, etc.); and/or other variations. When media content is captured, the photographer or videographer may or may not be aware of what device(s) will be used to view the content, which can make the creation of media content difficult.

SUMMARY

The present disclosure is directed to a content capture service. An entity (e.g., a device user) can interact with a device (e.g., a user device) to create a media project ("project"). The project can include, in some embodiments, a video, an image, one or more scenes or instances of video and/or images combined into a single file or group of files, or the like. The project also can correspond to a single video file or a single streaming video session and is not limited to multiple instances of video, images, audio, and/or combinations thereof compiled and/or combined into a single work. According to some embodiments, a project can be created in response to detecting, at the user device, a request to capture media or in response to explicitly invoking the creation of a project. Thus, the functionality illustrated and described herein can be triggered by detecting activation of a camera application for images or video, initiation of a streaming video session, activation of the content capture application, combinations thereof, or the like.

In response to detecting that a project is to be created, one or more instances of project definition data can be obtained via interactions at the user device, from settings, from preferences, from other entities, combinations thereof, or the like. The project definition data can be used by the user device and/or a server computer (e.g., by a content capture application executed by the user device and/or by a content capture service hosted by the server computer) to create one or more project definition(s). The project definition can define various aspects of the project such as, for example, directorial opinions and/or missions for the project, text and/or speech to be captured, budget constraints (where budget can be in terms of time (e.g., a duration of the project), money (e.g., a cost of the project), bandwidth (e.g., a connection speed and/or total data transfer limit for transmission of the project), combinations thereof, or the like), combinations thereof, or the like. In some embodiments, the project definition can be used to create one or more capture suggestions.

One or more device capabilities can be known or can be determined for the user device or other device(s) being used to capture one or more instances of media content for the project. Thus, for example, the device capabilities can define a maximum resolution for video that is captured by the user device, a data transfer rate attainable and/or sustainable for the user device, data processing and/or storage capabilities, combinations thereof, or the like. The device capabilities can be used in association with and/or instead of the project definitions to create one or more capture suggestions.

Based on the project definitions, the device capabilities, and/or the capture suggestions, the content capture application or the content capture service can create one or more capture suggestions. The capture suggestions can provide guidance to a user or other entity capturing the one or more instances of media content to ensure (or attempt to ensure) that the captured media satisfies the various constraints entered by the user or other entity such as, for example, the mood desired, the budget constraints, the directorial mission and/or opinions, the script intended, combinations thereof, or the like. Thus, the capture suggestions can guide the user or other entity during capture of the media content for the project. The capture suggestions can be provided, in some embodiments, as spoken commands, as popup screens, as screen overlays, as other user interface elements, combinations thereof, or the like. The user or other entity can accept or adopt one or more of the capture suggestions via interactions with the user device. Such compliance and/or adoption of the capture suggestions can be detected and tracked for learning and/or tracking purposes in some embodiments.

In some embodiments, the media content being captured can be modified in association with the one or more capture suggestions. For example, in some embodiments placement of an advertisement may be suggested by the content capture application and/or the content capture service, and therefore the advertisement can be embedded in the media content to create modified media content (e.g., the media content with the advertisement). In some other embodiments, the media content can be modified by applying suggested zooming, panning, cropping, adjusting resolution, adjusting audio rates, applying coder-decoders ("codecs"), etc. by the user and/or by the content capture application or content capture service. The one or more instances of modified media content can be packaged by the content capture application and/or the content capture service to create the project. In various embodiments, the project can correspond to a single data file (e.g., a movie project that can be formed by creating a new file based on multiple files). In some other embodiments, the project can correspond to multiple data files (e.g., multiple video files and audio files that can be assembled according to instructions included in the project, or the like). The project can be output by the user device and/or the server computer to a recipient.

According to one aspect of the concepts and technologies disclosed herein, a device is disclosed. The device can include a processor and a memory. The memory can store computer-executable instructions that, when executed by the processor, cause the processor to perform operations. The operations can include determining a project definition for a media project that can include a video that is to be captured via a user device that can include and/or can be equipped with a camera. The operations further can include determining a device capability of the user device. The device capability can include a video capability and a networking capability of the user device. The operations further can include determining based on the media project definition and the device capability, a capture suggestion. The capture suggestion can include instructions relating to content to be included in the video and can be provided to the user device before the video is captured or during capture of the video. The operations further can include obtaining media content based on the video, assembling the media project including the media content, and outputting the media project to a recipient.

In some embodiments, determining the device capability can include identifying the user device, identifying a connection statistic for a communication channel that is expected to be used for delivery of the media project, and determining a baseline recommendation based on an identity of the user device and the connection statistic. In some embodiments, determining the device capability can include determining a capability of the camera, the capability including one or more of a frame rate or a resolution, and determining a baseline recommendation based on the capability of the camera. In some embodiments, the capture suggestion can be delivered to a display of the user device. In some embodiments, the capture suggestion can include one or more of a suggestion to zoom the camera, a suggestion to crop a scene, or a suggestion to change an aim of the camera.

According to another aspect of the concepts and technologies disclosed herein, a method is disclosed. The method can include determining, at a device that can include a processor, a project definition for a media project. The media project can include a video that is to be captured via a user device that can include a camera. The method further can include determining, by the processor, a device capability of the user device. The device capability can include a video capability and a networking capability. The method further can include determining, by the processor and based on the project definition and the device capability, a capture suggestion. The capture suggestion can include instructions relating to content to be included in the video. The method further can include providing, by the processor, the capture suggestion to the user device before the video is captured; obtaining, by the processor, media content based on the video; assembling, by the processor, the media project that can include the media content; and outputting, by the processor, the media project to a recipient.

In some embodiments, determining the project definition can include determining a location associated with the media project; and analyzing the location associated with the media project to determine the project definition. The project definition can include a location at which the video is to be captured. In some embodiments, determining the project definition can include obtaining a text associated with the media project; and analyzing the text associated with the media project to determine the project definition. The project definition can include text that is to be represented in the video.

In some embodiments, determining the project definition can include obtaining a budget associated with the media project; and analyzing the budget associated with the media project to determine the project definition. The project definition can include a budget that capture of the video must satisfy. In some embodiments, the budget can include a time budget. The time budget can include a time range between a minimum time and a maximum time, and the capture suggestion can represent a remaining portion of the time budget. In some embodiments, determining the device capability can include identifying the user device, identifying a connection statistic for a communication channel that is expected to be used for delivery of the project; and determining a baseline recommendation based on an identity of the user device and the connection statistic.

In some embodiments, determining the device capability can include determining a capability of the camera, the capability including a frame rate and a resolution, and determining a baseline recommendation based on the capability of the camera. In some embodiments, determining the device capability further can include delivering the baseline recommendation to the user device, and modifying the baseline recommendation based on input via the user device. In some embodiments, the capture suggestion can be delivered to a display of the user device. In some embodiments, the capture suggestion can include one or more of a suggestion to zoom the camera, a suggestion to crop a scene, or a suggestion to change an aim of the camera. In some embodiments, the capture suggestion can include an indication of a budget remaining. In some embodiments, the capture suggestion can be delivered to a display of the user device. The capture suggestion can include a suggestion to capture a spoken word in the video, where the spoken word can be based on the text.

According to yet another aspect of the concepts and technologies disclosed herein, a computer storage medium is disclosed. The computer storage medium can store computer-executable instructions that, when executed by a processor, cause the processor to perform operations. The operations can include determining a project definition for a media project that can include a video that is to be captured via a user device that can include a camera. The operations further can include determining a device capability of the user device. The device capability can include a video capability and a networking capability of the user device. The operations further can include determining based on the project definition and the device capability, a capture suggestion. The capture suggestion can include instructions relating to content to be included in the video and can be provided to the user device before the video is captured or during capture of the video. The operations further can include obtaining media content based on the video, assembling the media project including the media content, and outputting the media project to a recipient.

In some embodiments, determining the device capability can include identifying the user device, identifying a connection statistic for a communication channel that is expected to be used for delivery of the media project, determining a capability of the camera, the capability including a frame rate and a resolution, and determining a baseline recommendation based on an identity of the user device, the connection statistic, and the capability of the camera. In some embodiments, the capture suggestion can be delivered to a display of the user device. The capture suggestion can include one or more of a suggestion to zoom the camera, a suggestion to crop a scene, or a suggestion to change an aim of the camera.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
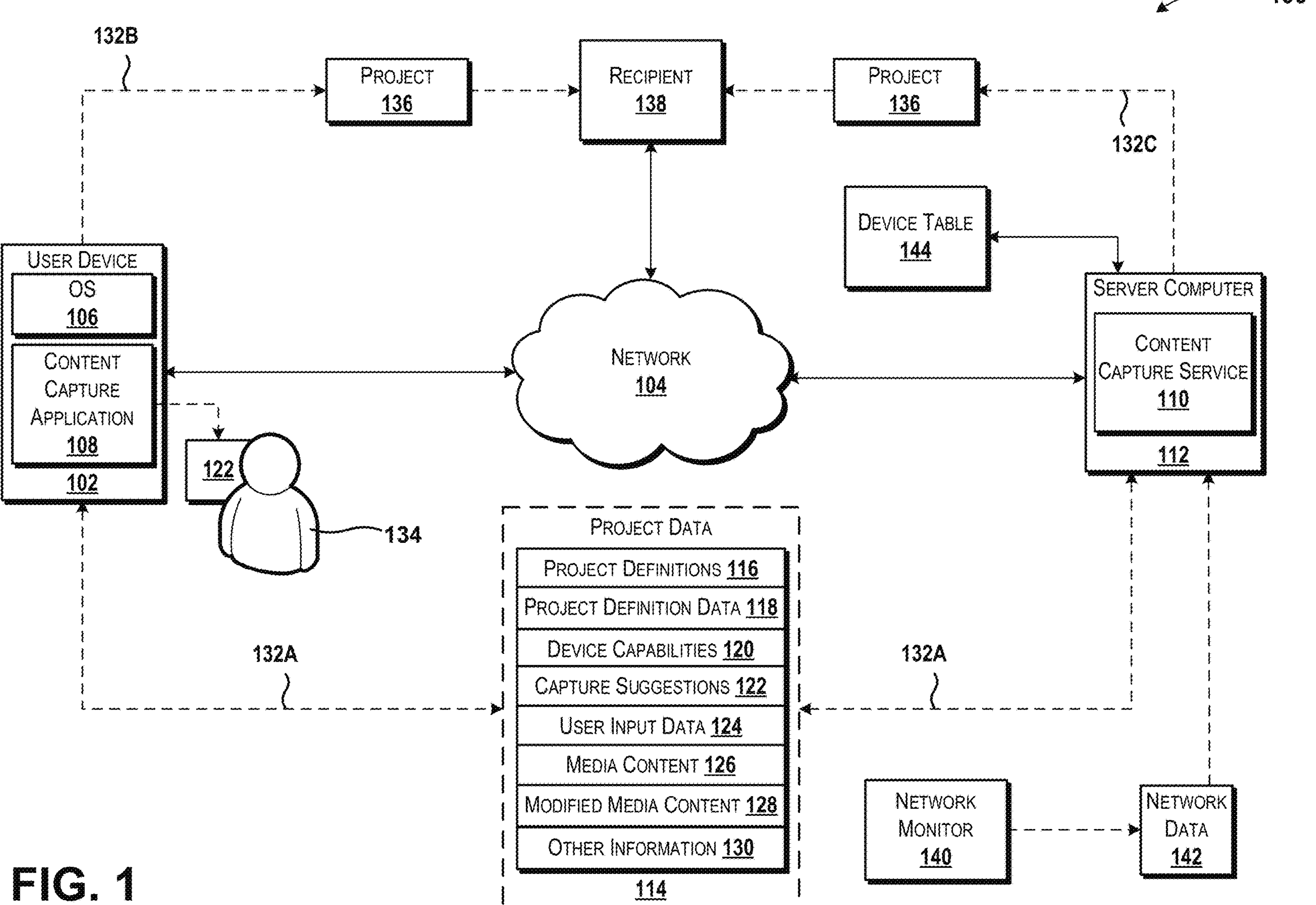
FIG. 1 is a system diagram illustrating an illustrative operating environment for various embodiments of the concepts and technologies described herein.

The following detailed description is directed to a content capture service. An entity (e.g., a device user) can interact with a device (e.g., a user device) to create a project a media project ("project"). The project can include, in some embodiments, one or more scenes or instances of video and/or images combined into a single file or group of files, a video, an image, or the like. The project also can correspond to a single video file or a single streaming video session and is not limited to multiple instances of video, images, audio, and/or combinations thereof compiled and/or combined into a single work. According to some embodiments, a project can be created in response to detecting, at the user device, a request to capture media or in response to explicitly invoking the creation of a project. Thus, the functionality illustrated and described herein can be triggered by detecting activation of a camera application for images or video, initiation of a streaming video session, activation of the content capture application, combinations thereof, or the like.

In response to detecting that a project is to be created, one or more instances of project definition data can be obtained via interactions at the user device, from settings, from preferences, from other entities, combinations thereof, or the like. The project definition data can be used by the user device and/or a server computer (e.g., by a content capture application executed by the user device and/or by a content capture service hosted by the server computer) to create one or more project definition(s). The project definition can define various aspects of the project such as, for example, directorial opinions and/or missions for the project, text and/or speech to be captured, budget constraints (where budget can be in terms of time (e.g., a duration of the project), money (e.g., a cost of the project), bandwidth (e.g., a connection speed and/or total data transfer limit for transmission of the project), combinations thereof, or the like), combinations thereof, or the like. In some embodiments, the project definition can be used to create one or more capture suggestions.

One or more device capabilities can be determined for the user device or other device(s) being used to capture one or more instances of media content for the project. The device capabilities can be known or determined for the user device and can be used to determine how the instances of media content are to be captured. Thus, for example, the device capabilities can define a maximum resolution for video that is captured by the user device, a data transfer rate attainable and/or sustainable for the user device, data processing and/or storage capabilities, combinations thereof, or the like. The device capabilities can be used in association with and/or instead of the project definitions to create one or more capture suggestions.

Based on the project definitions and/or the capture suggestions, the content capture application or the content capture service can create one or more capture suggestions. The capture suggestions can provide guidance to a user or other entity capturing the one or more instances of media content to ensure (or attempt to ensure) that the captured media satisfies the various constraints entered by the user or other entity such as, for example, the mood desired, the budget constraints, the directorial mission and/or opinions, the script intended, combinations thereof, or the like. Thus, the capture suggestions can guide the user or other entity during capture of the media content for the project. The capture suggestions can be provided, in some embodiments, as spoken commands, as popup screens, as screen overlays, as other user interface elements, combinations thereof, or the like. The user or other entity can accept or adopt one or more of the capture suggestions via interactions with the user device. Such compliance and/or adoption of the capture suggestions can be detected and tracked for learning and/or tracking purposes in some embodiments.

In some embodiments, the media content being captured can be modified in association with the one or more capture suggestions. For example, in some embodiments placement of an advertisement may be suggested by the content capture application and/or the content capture service, and therefore the advertisement can be embedded in the media content to create modified media content (e.g., the media content with the advertisement). In some other embodiments, the media content can be modified by applying suggested zooming, panning, cropping, adjusting resolution, adjusting audio rates, applying codecs, etc., by the user and/or by the content capture application or content capture service. The one or more instances of modified media content can be packaged by the content capture application and/or the content capture service to create the project. In various embodiments, the project can correspond to a single data file (e.g., a movie project that can be formed by creating a new file based on multiple files). In some other embodiments, the project can correspond to multiple data files (e.g., multiple video files and audio files that can be assembled according to instructions included in the project, or the like). The project can be output by the user device and/or the server computer to a recipient.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for providing, interacting with, and using a content capture service will be described, according to an illustrative embodiment of the concepts and technologies disclosed herein. The operating environment 100 shown in FIG. 1 can include a user device 102. The user device 102 can operate in communication with and/or as part of a communications network ("network") 104, though this is not necessarily the case.

According to various embodiments, the functionality of the user device 102 may be provided by one or more server computers, desktop computers, mobile telephones, smartphones, tablet computers, laptop computers, set-top boxes, other computing systems, and the like. It should be understood that the functionality of the user device 102 can be provided by a single device, by two similar devices, and/or by two or more dissimilar devices. For purposes of describing the concepts and technologies disclosed herein, the user device 102 is described herein as a mobile telephone or a smartphone. It should be understood that this embodiment is illustrative, and should not be construed as being limiting in any way.

The user device 102 can execute an operating system 106 and one or more application programs such as, for example, a content capture application 108. The operating system 106 can include a computer program for controlling the operation of the user device 102. The content capture application 108 can include an executable program that can be configured to execute on top of the operating system 106 to provide various functions as illustrated and described herein.

According to various embodiments of the concepts and technologies disclosed herein, the content capture application 108 can be configured to capture content such as, for example, photographs, video, audio, and/or a combination thereof. The content capture application 108 also can be used to save, upload, and/or stream the captured content to one or more entities such as users, devices, web servers, social media servers, application servers, streaming video services, other entities, combinations thereof, or the like. The functionality of the content capture application 108 will be described in additional detail below, after introducing some additional elements of the operating environment 100 shown in FIG. 1.

According to various embodiments of the concepts and technologies disclosed herein, the operating environment 100 also can include a content capture service 110. The content capture service 110 can include an executable program that can be executed by a processor of a computing device such as, for example, a server such as the server computer 112 illustrated in FIG. 1. It should be understood that this example is illustrative, and therefore should not be construed as being limiting in any way. Although the content capture application 108 and the content capture service 110 are illustrated as being located at separate devices (e.g., the user device 102 and the server computer 112, respectively), it should be understood that in various embodiments of the concepts and technologies disclosed herein, the functionality illustrated and described herein for the content capture service 110 can be performed by the content capture application 108. As such, the illustrated embodiments should be understood as being illustrative of only some contemplated embodiments of the concepts and technologies disclosed herein and should not be construed as being limiting in any way.

In the illustrated embodiment, the content capture application 108 can be configured to interact with the content capture service 110. In particular, the content capture application 108 and the content capture service 110 can exchange project data 114. The project data 114 can include, but is not limited to, project definitions 116, device capabilities 120, capture suggestions 122, user input data 124, media content 126, modified media content 128, and/or other information 130. In some embodiments, the project data 114 can be created by the content capture application 108. In some other embodiments, some of the project data 114 can be created by the content capture application 108 and some of the project data 114 can be created by the content capture service 110. In yet other embodiments. In the illustrated and described embodiments, part of the project data 114 is created at the user device 102 (by the content capture application 108) and part of the project data 114 is created at the server computer 112 (by the content capture service 110). It should be understood that this example is illustrative, and therefore should not be construed as being limiting in any way.

The project definitions 116 can include data or other information that can define one or more aspects of a media project. The project definitions 116 can be based on one or more types of data and/or information (e.g., project definition data 118). The project definition data 118 can include, but is not limited to, location information that can define a geographic location of a captured scene, a geographic location of a user device 102 being used to capture media, other location information, combinations thereof, or the like; text or script data that can represent a script for a media project such as, for example, spoken words that are to be said in or in association with captured media, printed text that will appear in and/or will be added to captured media, combinations thereof, or the like; view history data that can represent prior viewership of media associated with a particular user, device, location, entity, combinations thereof, or the like; budget information that defines a monetary budget for a particular media project, a time duration associated with the media project and/or an instance of captured media, a bandwidth budget for communication (upload, download, streaming, etc.) of a particular instance of captured media and/or a media project, combinations thereof, or the like; and/or other information that can be used to define one or more aspects of a media project. These and other types of information that can define the project definition data 118 can be defined by a user or other entity during creation and/or requesting of a media project or instance of media content, by preferences, by settings, by network availability and/or performance characteristics, combinations thereof, or the like. The use of the project definitions 116 and/or the project definition data 118 in creation of the project definitions 116 will be described in more detail below, at least with reference to FIGS. 2-3.

The device capabilities 120 can include data or other information that can define one or more capabilities of one or more device that will be or is being used to capture content associated with a media project. In the context of the example embodiment shown in FIG. 1, the device capabilities 120 can include data or other information that can define one or more capabilities of the user device 102. The device capabilities 120 can define, for example, one or more communication capabilities of the user device 102 such as, for example, an average and/or peak data transmission rate, an average and/or peak data download rate, combinations thereof, or the like. The device capabilities 120 also can define, for example, one or more camera capabilities of the user device 102 such as, for example, a minimum resolution for content capture, a maximum resolution for content capture, a range of resolutions for content capture, a minimum frame rate for content capture, a maximum frame rate for content capture, a range of frame rates for content capture, an optical and/or digital zoom capability of a camera used for content capture, a minimum and/or maximum field of view for content capture, a minimum and/or maximum depth of field for content capture, combinations thereof, or the like.

The device capabilities 120 also can define, for example, one or more processing capabilities of the user device 102 such as, for example, a computational capability of the user device 102 (e.g., for pre-processing on the user device 102 before data transmission), a data storage capability of the user device 102, audio and/or video encoding capabilities associated with the user device 102, combinations thereof, or the like. The device capabilities 120 also can define, for example, one or more audio capabilities of the user device 102 such as, for example, a sampling rate of an audio device (e.g., a microphone) of the user device 102, an audio conversion rate associated with the user device 102, audio codecs available, combinations thereof, or the like. Other capabilities of the user device 102 also can be defined by the device capabilities 120 and can be used for various purposes as will be explained in more detail below. The above-mentioned and other types of information can define the device capabilities 120 and can be defined by a user (e.g., a network operator, device manufacturer, or other entity), by settings, combinations thereof, or the like. The creation of and/or use of the device capabilities 120 will be described in more detail below, at least with reference to FIGS. 2-4.

The capture suggestions 122 can define one or more suggestions for capturing media content 126. The capture suggestions 122 can be surfaced to a user or other entity associated with the user device 102 in various manners as will be illustrated and described hereinbelow. According to various embodiments, the capture suggestions 122 can define, among other things, suggestions for mood continuity during a media project (e.g., a visual and/or audio mood and how those moods can be continued throughout a project); proposed cut-point timing for syntax and/or mood of a media project (e.g., detecting how and when to cut a scene or instance of media content 126 based on movements, zoom levels, depth of field, field of view, focal length, or the like associated with a particular instance of media content 126); content completion suggestions for a particular instance of media content 126 (e.g., a scene or view cropping suggestion, an audio suggestion, a three-dimensional object suggestion, a background suggestion, combinations thereof, or the like); a specific object of focus (e.g., what object to focus on in a particular scene or instance of media content 126) for a particular instance of media content 126; advertising suggestions (e.g., analysis for alignment with advertising using pre-bidding and/or pre-defined optimization); regional modifications to media content 126 and/or a media project based on locality or expected audience information (e.g., removing sensitive content and/or substituting content based on locale or expected audience, etc.); other suggestions (e.g., visual editing or alignment of spoken words to a pre-determined script); combinations thereof; or the like. These capture suggestions 122 can be determined and provided during capturing of the media content 126 and/or an instance thereof, in some embodiments. The creating of capture suggestions 122 and the providing of capture suggestions 122 to a user device 102 will be illustrated and described in more detail below.

The user input data 124 can include one or more instances of user input. The user input data 124 can include, for example, information that can correspond to the project definitions 116 illustrated and described herein, information that can define one or more targets or objectives associated with a media project or instance of media content 126, data that corresponds to a script or text associated with a media project or instance of media content 126, location data that defines one or more geographic locations associated with a media project or instance of media content 126, budget information, combinations thereof, or the like. The user input data 124 also can correspond to one or more selection(s) that can be made, for example, in response to the surfacing of capture suggestions 122 or the like to a user via the user device 102. Thus, for example, if a user accepts or selects a particular capture suggestion 122, data indicating the selection can be communicated or stored as the user input data 124. The user input data 124 can be used to modify the media project or one or more instance of media content 126, as will be illustrated and described in more detail below.

The media content 126 can correspond to captured media such as audio, video, images, combinations thereof, or the like. The modified media content 128 can include a modified version of one or more instance of media content 126. For example, if a capture suggestion 122 suggests a cropped view of a scene being filmed, and if that capture suggestion 122 is accepted, the modified media content 128 can correspond to a cropped view of the scene. Because other modifications to the captured media content 126 will be evident with reference to the various methods and screen displays illustrated and described herein, it should be understood that many modifications are possible and are contemplated. As such, the above example is merely illustrative and should not be construed as being limiting in any way.

The other information 130 can include various types of information that can be exchanged between the user device 102 and the server computer 112, in embodiments in which the user device 102 communicates with the server computer 112 to provide embodiments of the concepts and technologies disclosed herein; or used by the user device 102 and/or the server computer 112 to provide the functionality illustrated and described herein. In particular, in some embodiments of the concepts and technologies disclosed herein, the other information 130 can include contextual information. The contextual information can include various forms of context that can be used to modify the media content 126 and/or to create capture suggestions 122 for the user 134. Some example forms of contextual information are discussed below.

According to some example embodiments of the concepts and technologies disclosed herein, the contextual information can be used to determine a context for the project 136 including, but not limited to, an intended audience for the project 136 and/or media content 126 included in the project 136, an intended viewing device (e.g., whether the project 136 will be viewed on a mobile phone, a desktop display, and/or in a movie theater) associated with the project 136 and/or media content 126 included in the project 136, a geographic location associated with the intended audience for the project 136 and/or media content 126 included in the project 136, a demographic and/or demographics for one or more intended audiences for the project 136 and/or media content 126 included in the project 136, one or more actor name(s) for the project 136 and/or media content 126 included in the project 136, one or more names of places associated with the project 136 and/or media content 126 included in the project 136 combinations thereof, or the like. Additionally, or alternatively, the contextual information can include a story line associated with the project 136 and/or media content 126 included in the project 136 and therefore can be used to inform suggestions for capturing media content 126. For example, if captured media content 126 relates to a sad moment in the story line, the context can be used to suggest colors, lighting, and/or other visual effects to reflect the mood. It should be understood that this example is illustrative, and therefore should not be construed as being limiting in any way.

The other information 130 also can provide context in terms of other media content 126 associated with a project 136 and therefore can be used to create capture suggestions 122 relating to mood, continuity, cut points, combinations thereof, or the like. The other information 130 also can include information that identifies one or more objects that appear in the media content 126 and/or the project 136 and therefore can be used to create suggestions relating to advertising or the like. Because the other information 130 can include various types of information that are illustrated and described herein, it should be understood that the above-listed examples are illustrative, and therefore should not be construed as being limiting in any way.

The exchange of the project data 114 between the user device 102 and the server computer 112 will be explained in additional detail below, after introducing the remaining entities shown in FIG. 1. As shown in FIG. 1, one or more communication channels 132A-C (hereinafter collectively and/or generically referred to as "communication channels 132") can be provided by the network 104 and/or other network connections to enable communications between the various entities included in the operating environment 100. For example, a first communication channel 132A can be exist between the user device 102 and the server computer 112 to enable communications between the user device 102 and the server computer 112 (and by way of this connectivity, to enable communications between the content capture application 108 and the content capture service 110 hosted and/or executed by the respective entities). Thus, the project data 114 can be exchanged, in some embodiments, between the user device 102 and the server computer 112 via the communication channel 132A.

For example, a user or other entity (hereinafter referred to as a "user 134") that has access to the user device 102 can input, upload, submit, or otherwise provide one or more instance(s) of project definition data 118 at the user device 102. Via communications between the user device 102 and the server computer 112, the one or more instance(s) of project definition data 118 can be provided to the server computer 112 for use as will be illustrated and described herein. Alternatively, the user device 102 can use the one or more instances of project definition data 118 without communicating with the server computer 112. As such, it can be appreciated that the communication channel 132A is not included in all embodiments of the concepts and technologies disclosed herein.

In some embodiments of the concepts and technologies disclosed herein, the user device 102 and/or the server computer 112 can output media content and/or a media project (hereinafter referred to as a "project") 136. In various embodiments of the concepts and technologies disclosed herein, the project 136 can be provided to a recipient 138 such as, for example, a web server, another user device, a streaming service, combinations thereof, or the like. Thus, it can be appreciated that the recipient 138 can correspond, in various embodiments, to one or more of a streaming video server, a social media server, a video server, a smartphone, a laptop, a desktop computer, a mobile telephone, a multimedia server, a messaging server, a networking device, a network, combinations thereof, or the like. Regardless of what entity is receiving the project 136, it can be appreciated that the project 136 may be provided to the recipient 138 via communications.

Thus, the operating environment 100 also can include a communication channel 132B, which can exist between the user device 102 and the recipient 138 in some embodiments (in which the user device 102 outputs the project 136). Additionally, or alternatively, the operating environment 100 can include a communication channel 132C, which can exist between the server computer 112 and the recipient 138 in some embodiments (in which the server computer 112 outputs the project 136). Because various embodiments of the operating environment 100 include providing the project 136 to the recipient 138 (or multiple recipients 138) by various entities, it should be understood that the illustrated embodiment of the operating environment 100 is illustrative and should not be construed as being limiting in any way.

In practice, a user 134 can interact with the user device 102 to create a project 136. As explained above, the project 136 can include a media project (e.g., multiple scenes of video and/or images combined into a single project), a video, an image, or the like. Thus, it should be understood that the project 136 can correspond to a single video file or a streaming video session and is not limited to multiple instances of video, images, audio, and/or combinations thereof compiled and/or combined into a single work (though such embodiments are also possible and are contemplated). The functionality illustrated and described herein can be invoked, for example, by detecting, at the user device 102, a request that corresponds to capturing media (e.g., activating a camera application for images or video, initiating a streaming video session, activating the content capture application 108, combinations thereof, or the like).

In response to detecting the request, one or more instances of project definition data 118 can be obtained via interactions at the user device 102. The project definition data 118 can be used by the user device 102 and/or the server computer 112 (e.g., by the content capture application 108 or the content capture service 110) to create the project definitions 116. The project definitions 116 can define various aspects of the project 136 such as, for example, directorial opinions and/or missions for the project 136, text and/or speech to be captured, budget constraints (time, money, bandwidth, etc.), and the like. These project definitions 116 can be used to create one or more capture suggestions 122, as will be more clearly understood below.

One or more device capabilities 120 can be determined for the user device 102 (or other device being used to capture one or more instances of media content 126 for the project 136). According to various embodiments, the identity of the user device 102 can be determined by the content capture application 108 or the content capture service 110 to determine one or more of the device capabilities 120. In some other embodiments, the device capabilities 120 can be known to the user device 102 and/or the server computer 112 and therefore may not be determined based on the identity of the user device 102. Regardless of how the capabilities of the user device 102 are known, the device capabilities 120 can be used to determine how the instances of media content 126 are to be captured. Thus, for example, the device capabilities can define a maximum resolution for video that is captured by the user device 102 (this maximum resolution can be based on the camera capabilities, the processing capabilities, data storage capabilities, and the data transmission capabilities of the user device 102, among other considerations) or one or more frame rates for captured video, etc. Thus, the device capabilities can be used (in association with and/or instead of the project definitions 116) to create the one or more capture suggestions 122, as will be explained in more detail below.

As will be explained in more detail below, particularly with reference to FIGS. 4 and 5D, some embodiments of the concepts and technologies disclosed herein can provide baseline recommendations to the user device 102. The baseline recommendations can provide preliminary suggestions (preliminary relative to the capture suggestions 122 illustrated and described herein) on how to capture content based on device capabilities 120, project definitions 116, or other considerations. In some embodiments, a user or other entity (e.g., the user 134) can be allowed and/or can be enabled to modify the baseline recommendations based on various considerations. The modified baseline recommendations can be used to create the capture suggestions 122. In some other embodiments, the baseline recommendations can be omitted. Because the modification of baseline recommendations to create the capture suggestions 122 is optional, it should be understood that such embodiments are illustrative and therefore are not limiting in any way.

Based on the project definitions 116 and/or the capture suggestions 122, the content capture application 108 or the content capture service 110 can create one or more capture suggestions 122. The capture suggestions 122 can provide guidance to a user 134 or other entity capturing the one or more instances of media content 126 to ensure that the captured media satisfies the various constraints entered by the user 134 or other entity such as, for example, the mood desired, the budget constraints, the directorial mission and/or opinions, the script intended, combinations thereof, or the like. Thus, the capture suggestions 122 can guide the user 134 or other entity during capture of the media content 126 for the project 136. Various aspects of these capture suggestions 122 (e.g., screen overlays and/or user interfaces that can be provided to guide the user 134 and/or other entity) will be illustrated and described below, particularly with reference to FIGS. 5A-5L. Because the capture suggestions 122 can be surfaced to the user 134 or other entity in a variety of manners and/or formats, it should be understood that the illustrated UIs are illustrative of the capture suggestions 122 and should not be construed as being limiting in any way.

According to various embodiments of the concepts and technologies disclosed herein, the user 134 or other entity can accept or adopt one or more of the capture suggestions 122 via interactions with the user device 102. In some embodiments, for example, the user 134 or other entity can select (e.g., by tapping, clicking, etc.) a capture suggestion 122 to indicate that this capture suggestion 122 is being adopted. In some other embodiments, the capture suggestion 122 can be provided as an overlay, and compliance with the overlay (e.g., a cropping suggestion, a panning suggestion, or the like) can be indicated by detecting (by the content capture application 108 and/or the content capture service 110) that the overlay is being complied with during the capture operation. Such compliance and/or adoption of the capture suggestions 122 can be detected and/or represented by user input data 124, in some embodiments. Thus, compliance with and/or adoption of capture suggestions 122 can be tracked for learning and/or tracking purposes if desired by the user 134 or other entity.

In some embodiments, the media content 126 being captured can be modified in association with the one or more capture suggestions 122. For example, in some embodiments placement of an advertisement may be suggested by the content capture application 108 and/or the content capture service 110, and therefore the advertisement can be embedded in the media content 126 to create modified media content 128 (e.g., the media content 126 with the advertisement). Because other modifications are possible and are contemplated (e.g., zooming, panning, cropping, adjusting resolution, adjusting frame rates, adjusting audio rates, applying codecs, etc.), it should be understood that the modified media content 128 can be the result of any type of modification to the media content 126.

The one or more instances of modified media content 128 can be packaged by the content capture application 108 and/or the content capture service 110 to create the project 136. In various embodiments, the project 136 can correspond to a single data file (e.g., a movie project that can be formed by creating a new file based on multiple files). In some other embodiments, the project 136 can correspond to multiple data files (e.g., multiple video files and audio files that can be assembled according to instructions included in the project 136, or the like). The project 136 can be output by the user device 102 and/or the server computer 112 to a recipient 138. These and other aspects of the concepts and technologies disclosed herein will be explained in more detail below.

In some embodiments, the operating environment 100 can also include a network monitor 140. The network monitor 140 can be configured to monitor network elements and/or links therebetween such as, for example, the communication channels 132 illustrated and described herein. The network monitor 140 can be configured to report on the network performance. In some embodiments, the network monitor 140 can provide network data 142 to the server computer 112 and/or the user device 102 automatically, periodically, and/or on-demand or on-request. The network data 142 can indicate, among other things, bandwidth availability associated with one or more of the communication channels 132 (e.g., latency, upload rates, download rates, combinations thereof, or the like), device processing and/or data storage capabilities (e.g., processing capacity, storage capacity, processing rates, data storage rates, combinations thereof, or the like), and/or other statistics associated with a network (e.g., the network 104), network devices, and/or devices in communication with the network (e.g., the user device 102, the server computer 112, etc.). Thus, the network data 142 or other forms of information can be used by the server computer 112 and/or the user device 102 to determine device capabilities 120 and/or the project definitions 116, among other things. It should be understood that this example is illustrative, and therefore should not be construed as being limiting in any way.

Similarly, the operating environment 100 also can include a device table 144. The device table 144 can be configured to store information relating to device capabilities such as, for example, camera resolutions, frame rates, storage capacities, data communication capacities, memory capacity, processing capacity, combinations thereof, or the like. The device table 144 can be stored at the user device 102, at the server computer 112, and/or at another data storage device or location that is external to one or more of the user device 102 and the server computer 112. Thus, it can be appreciated that the device table 144 can be used by the user device 102 and/or the server computer 112 to determine the device capabilities 120 and/or the project definitions 116 as illustrated and described herein. It should be understood that this example is illustrative, and therefore should not be construed as being limiting in any way.

In some embodiments, the operating environment 100 also can include an advertising database, which can be used to store one or more advertisements. Thus, in some embodiments of the concepts and technologies disclosed herein, the content capture service 110 and/or the content capture application 108 can be configured to obtain an advertisement from the advertising database (or elsewhere) for insertion into the media content 126 and/or the project 136. Thus, it can be appreciated that the modified media content 126 can correspond to the media content 126 with an embedded advertisement, in some embodiments. It should be understood that this example is illustrative, and therefore should not be construed as being limiting in any way.

FIG. 1 illustrates one user device 102, one network 104, one server computer 112, three communication channels 132, and one recipient 138. It should be understood, however, that various implementations of the operating environment 100 can include zero, one, or more than one user device 102; zero, one, or more than one network 104; zero, one, or more than one server computer 112; one, two, three, or more than three communication channels 132; and/or zero, one, or more than one recipient 138. As such, the illustrated embodiment should be understood as being illustrative, and should not be construed as being limiting in any way.

Figure 2:
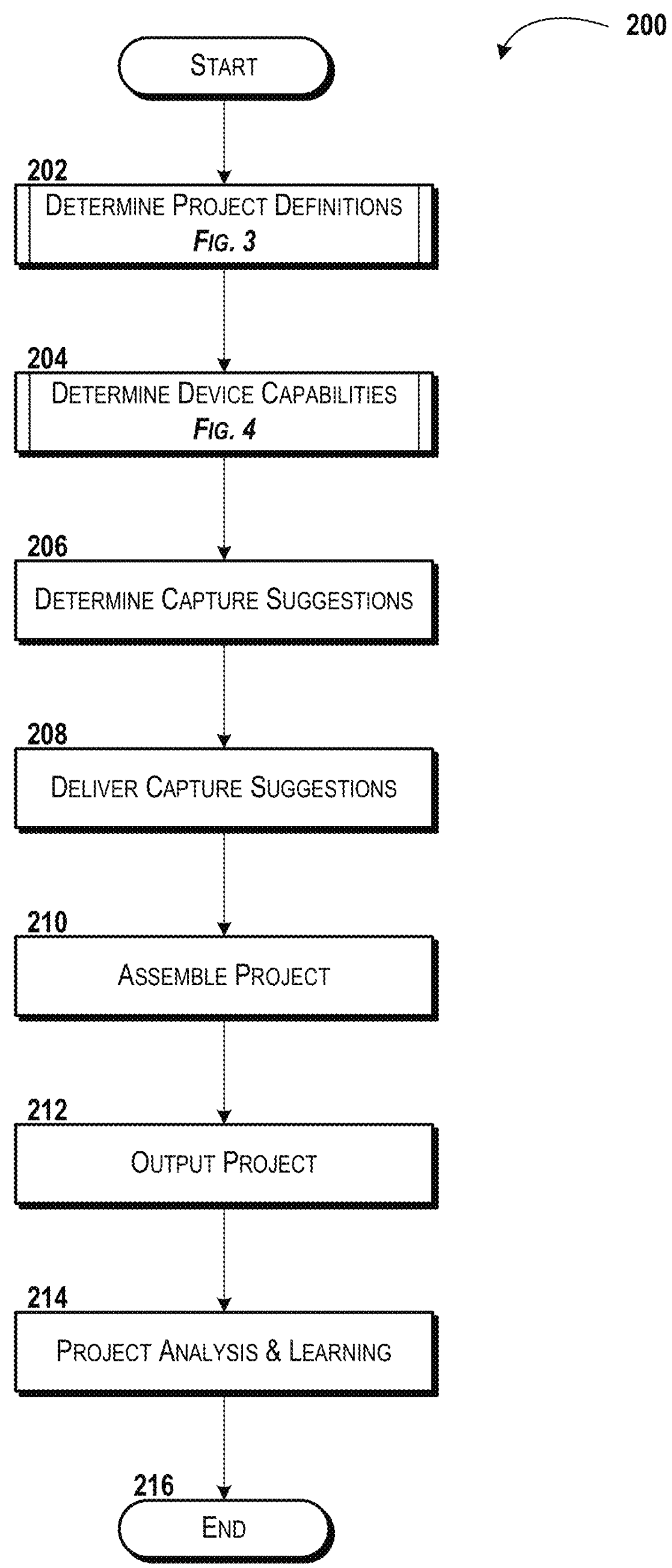
FIG. 2 is a flow diagram showing aspects of a method for creating a project, according to an illustrative embodiment of the concepts and technologies described herein.

Turning now to FIG. 2, aspects of a method 200 for creating a project 136 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the user device 102 or the server computer 112, to perform one or more operations and/or causing the processor to direct other components of the computing system or device to perform one or more of the operations.

For purposes of illustrating and describing the concepts of the present disclosure, the method 200 is described herein as being performed by the server computer 112 via execution of one or more software modules such as, for example, the content capture service 110. It should be understood that additional and/or alternative devices and/or network nodes can provide the functionality described herein via execution of one or more modules, applications, and/or other software including, but not limited to, the content capture service 110. For example, as explained above with reference to FIG. 1, the functionality of the content capture service 110 can be incorporated into the content capture application 108, and as such, the user device 102 can perform the operations described herein, in some embodiments. Thus, the illustrated embodiment of the method 200 should be understood as being illustrative, and should not be viewed as being limiting in any way.

The method 200 begins at operation 202. At operation 202, the server computer 112 can determine project definitions 116. According to various embodiments of the concepts and technologies disclosed herein, the project definitions 116 can be determined by the server computer 112 by way of analyzing one or more instances of project definition data 118 and/or other information 130. As will be explained in more detail hereinbelow, the project definition data 118 can include, but is not limited to, location information that can define one or more geographic locations; text or script data that can represent a script for a project 136; view history data that can represented prior viewership of media associated with a particular user, device, location, entity, combinations thereof, or the like; budget information that can define various budgets (e.g., a monetary budget for the project 136; a minimum, maximum, or range of time duration for the project 136; a bandwidth limit for uploading, downloading, streaming, or otherwise transmitting the project 136; and/or other information that can be used to define one or more aspects of a project 136). These and other types of information can be used to define the project definitions 116 and can be defined by a user or other entity, by preferences, by settings, by network availability and/or performance characteristics, combinations thereof, or the like. Additional details of the determination of the project definitions 116 will be illustrated and described with reference to FIG. 3.

From operation 202, the method 200 can proceed to operation 204. At operation 204, the server computer 112 can determine capabilities of the user device 102 (or other device being used to capture media content 126) such as the device capabilities 120. According to various embodiments of the concepts and technologies disclosed herein, the device capabilities 120 can include any capabilities of the user device 102 that can affect creation of the project 136.

In various example embodiments, the device capabilities can represent battery life of the user device 102, memory capacity of the user device 102, processing speed and/or other processing capabilities of the user device 102, resolution capabilities of one or more cameras of the user device 102, frame rate capabilities of one or more cameras of the user device 102, optical and/or digital zoom capabilities of one or more cameras of the user device 102, audio capture capabilities (e.g., sampling rate, effective range, frequency range, etc.) of one or more audio devices (e.g., microphones) of the user device 102, networking capabilities (e.g., connection speed, latency, transmission speeds) of the user device 102 and/or a current or expected network connection of the user device 102, available audio and/or video codecs, combinations thereof, or the like. As such, the device capabilities 120 can represent (or can be analyzed to determine) various aspects of the project 136 that is to be created such as, for example, video resolution, video frame rates, video file size, video length, video color depth, video format, combinations thereof, or the like; audio quality, audio file size, audio sampling rate, audio frequency range, audio format, combinations thereof, or the like; project file size, length, format, combinations thereof, or the like; and/or other aspects of the project 136 that is to be created. Additional details of determining the device capabilities 120 will be illustrated and described with reference to FIG. 4.

From operation 204, the method 200 can proceed to operation 206. At operation 206, the server computer 112 can determine capture suggestions 122. According to various embodiments of the concepts and technologies disclosed herein, the capture suggestions 122 can include one or more suggestions for capturing the media content 126. The capture suggestions 122 can be based on one or more of the project definitions 116 or the device capabilities 120. Thus, it can be appreciated that the capture suggestions 122 can include suggestions relating to location, budget, target/subject of the media content 126, optical and/or digital zoom level of a camera being used to capture the media content 126, pan of a camera being used to capture the media content 126, cropping of a scene and/or subject being captured in the media content 126, content and/or context of the media content 126, combinations thereof, or the like. Various example user interfaces will be illustrated and described herein for how the capture suggestions 122 can be provided to a user 134, particularly with reference to FIGS. 5A-5L. Various embodiments of the capture suggestions 122 will be more clearly understood with reference to these drawings, but a few examples are provided here for illustration.

In one example embodiment, a capture suggestion 122 determined in operation 206 can include, for example, a suggestion to crop media content 126 being captured around a specified target (e.g., a sign, a person, a place, or the like). In another example embodiment, a capture suggestion 122 determined in operation 206 can include, for example, a suggestion to zoom in on a specified target (e.g., a sign, a person, a place, or the like) during capture of the media content 126. In another example embodiment, a capture suggestion 122 determined in operation 206 can include, for example, a suggestion to zoom out during capture of the media content 126.

In another example embodiment, a capture suggestion 122 determined in operation 206 can include, for example, a suggestion to pan a camera one direction or another during capture of the media content 126. In another example embodiment, a capture suggestion 122 determined in operation 206 can include, for example, a suggestion to rotate a camera (e.g., so the view is rotated clockwise or counter-clockwise) during capture of the media content 126. In yet another example embodiment, a capture suggestion 122 determined in operation 206 can include, for example, a suggestion to continue a detected mood from a previous scene (e.g., by zooming to a particular zoom level, by panning to a particular scene, by framing the view on a particular color, brightness, or the like, combinations thereof, or the like).

In another example embodiment, a capture suggestion 122 determined in operation 206 can include, for example, a suggestion to time a cut-point of the media content 126 for a particular syntax or mood. In yet another example embodiment, a capture suggestion 122 determined in operation 206 can include, for example, a suggestion to focus on a particular object, target, person, or place during capture of the media content 126. In yet another example embodiment, a capture suggestion 122 determined in operation 206 can include, for example, a suggestion to add speech or text to a particular scene during capture of the media content 126. Other suggestions that can be provided as the capture suggestions 122 will be illustrated and described herein, and as such, it should be understood that these examples are illustrative, and therefore should not be construed as being limiting in any way.

From operation 206, the method 200 can proceed to operation 208. At operation 208, the server computer 112 can deliver the capture suggestions 122 determined in operation 206 to the user device 102. In some embodiments, the functionality of operation 208 can correspond to the user device 102 surfacing the capture suggestions 122, e.g., by presenting the capture suggestions 122 on a display, by providing an overlay for guiding capture of the media content 126 or for providing other instructions, by playing a sound at the user device 102 or other device, by displaying an alert at the user device 102 or other device, by providing a voice command at the user device 102 or other device, combinations thereof, or the like, or otherwise outputting the capture suggestions 122 and/or portions thereof at the user device or elsewhere. Because the capture suggestions 122 can be provided in other manners, it should be understood that these examples are illustrative, and therefore should not be construed as being limiting in any way.

From operation 208, the method 200 can proceed to operation 210. At operation 210, the server computer 112 can assemble the project 136. As can be appreciated from the description of FIG. 1, the project 136 can include a media project (e.g., multiple scenes of video and/or images combined into a single project), one or more video files, one or more image files, combinations thereof, or the like. Thus, it should be understood that the project 136 can correspond to a one or more video files, image files, audio files, and/or a streaming data sessions. Thus, operation 210 can include obtaining the one or more video files, image files, audio files, and/or other media content 126 or modified media content 128. In some embodiments, the project 136 can include one or more instances of video files, image files, audio files, and/or combinations thereof compiled and/or combined into a single work. Thus, operation 210 can also include the one or more instances of media content 126 and/or modified media content 128 being complied into a project 136 (e.g., a finished video project). It should be understood that this example is illustrative, and therefore should not be construed as being limiting in any way.

From operation 210, the method 200 can proceed to operation 212. At operation 212, the server computer 112 can output the project 136. In various embodiments, the project 136 can be provided to a recipient 138 such as a web server, an application server, a consumer device (e.g., a smartphone, mobile phone, tablet, laptop, or the like), a streaming service or streaming service server, a social media server (e.g., a server associated with a live video share service), combinations thereof, or the like. Thus, it can be appreciated that the recipient 138 can correspond, in various embodiments, to one or more streaming video server, video service device, a social media server, a video server, a smartphone, a laptop, a desktop computer, a mobile telephone, a multimedia server, a messaging server, a networking device, a network, combinations thereof, or the like. In some other embodiments, the project 136 can be output to a data storage device at or in communication with the server computer 112 or the user device 102 (e.g., a database, a memory of the user device 102, or the like). Because the project 136 can be stored or output to almost any recipient 138, it should be understood that these examples are illustrative, and therefore should not be construed as being limiting in any way.

From operation 212, the method 200 can proceed to operation 214. At operation 214, the server computer 112 can perform project analysis and learning on the project 136. It can be appreciated that the functionality of operation 214 can occur before assembly of the project 136 or elsewhere. At any rate, operation 214 can correspond to the server computer 112 or other device analyzing the project 136, the capture suggestions 122, the user input data 124, the media content 126, the modified media content 128, and/or other project data 114 to determine how the project 136 has been affected by the capture suggestions 122. Thus, operation 214 can correspond to the server computer 112 or user device 102 performing machine learning or other analysis to improve future suggestions and/or operations of the content capture application 108 and/or the content capture service 110. This learning can be performed to improve functionality of the content capture application 108 and/or the content capture service 110 and/or to understand how particular users or other entities use information created by the content capture application 108 and/or the content capture service 110. Because other types of analysis and learning can be performed, it should be understood that these examples are illustrative, and therefore should not be construed as being limiting in any way.

From operation 214, the method 200 can proceed to operation 216. The method 200 can end at operation 216.

Figure 3:
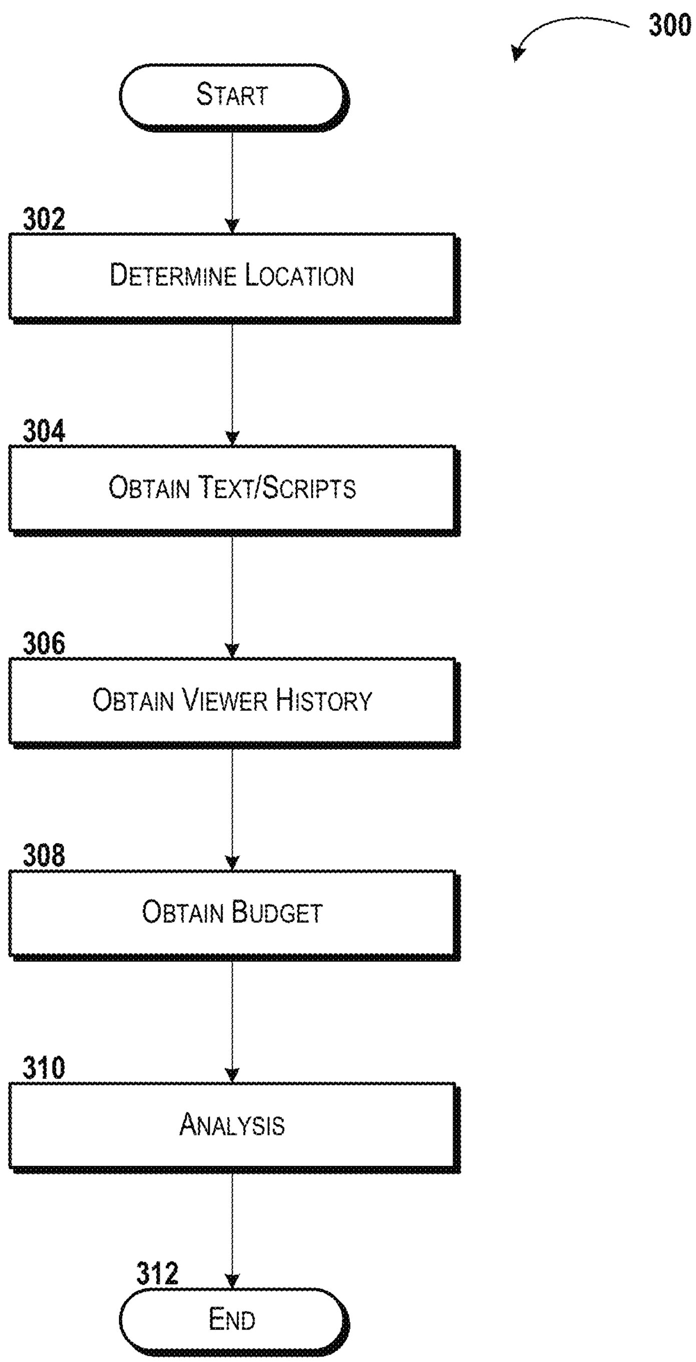
FIG. 3 is a flow diagram showing aspects of a method for receiving project definitions, according to an illustrative embodiment of the concepts and technologies described herein.

Turning now to FIG. 3, aspects of a method 300 for receiving project definitions will be described in detail, according to an illustrative embodiment. For purposes of illustrating and describing the concepts of the present disclosure, the method 300 is described herein as being performed by the server computer 112 via execution of one or more software modules such as, for example, the content capture service 110. It should be understood that additional and/or alternative devices and/or network nodes can provide the functionality described herein via execution of one or more modules, applications, and/or other software including, but not limited to, the content capture service 110. For example, as explained above with reference to FIG. 1, the functionality of the content capture service 110 can be incorporated into the content capture application 108, and as such, the user device 102 can perform the operations described herein, in some embodiments. Thus, the illustrated embodiment of the method 300 should be understood as being illustrative, and should not be viewed as being limiting in any way.

The method 300 begins at operation 302. At operation 302, the server computer 112 can determine a location associated with the project 136, the media content 126 or other content being captured, the user device 102, and/or other entities, devices, or the like such as, for example, other devices being used to capture the media content 126 or other content for the project 136. According to various embodiments of the concepts and technologies disclosed herein, the location can be determined based on one or more instances of location data such as, for example, GPS location information obtained from a location device or system of the user device 102 (or other device capturing the media content 126), a location server (e.g., a location determination device or server of a wireless network), proximity to location beacons, other location determination technologies (e.g., triangulation, or the like), combinations thereof, or the like. Thus, it can be appreciated that the location(s) determined in operation 302 can be obtained from the user device 102, from a user 134, from the server computer 112, and/or from other devices or entities (e.g., from a location server or other network device). Because the locations associated with a particular project 136 can be obtained in additional and/or alternative manners, it should be understood that the above examples are illustrative, and therefore should not be construed as being limiting in any way.

According to various embodiments of the concepts and technologies disclosed herein, location information can be used (alone or in association with other data such as contextual information or the like) to modify the media content 126 and/or the project 136. For example, location-based sensitivities and/or culture may inform the content capture service 110 to modify certain aspects of a project 136. For example, the content capture service 110 can be configured to determine an expected audience for the project 136. If the expected audience for the project 136 includes children, for example, the content capture service 110 can remove strong language and/or mature content. Similarly, various evolving social "norms" may be used to create suggestions and/or to modify the media content 126 automatically. It should be understood that this example is illustrative, and therefore should not be construed as being limiting in any way.

From operation 302, the method 300 can proceed to operation 304. At operation 304, the server computer 112 can obtain text and/or scripts associated with the project 136 such as, for example, a text of spoken words to be said in a particular project 136, text that is to be viewable in a particular project 136 (e.g., text on buildings, screens, documents, or other entities visible in media associated with the project 136), text that is to be overlaid on an image associated with the project 136 (e.g., text providing location or background information for an image or video, or the like), and/or other text. The scripts can include, for example, a script for a project 136 including movement of characters, targets for the media content 126, scene descriptions, spoken words, etc. associated with the project 136. Thus, operation 304 can correspond to the server computer 112 obtaining text and/or descriptions associated with the project 136. Because other text and/or scripts may be obtained in various embodiments, it should be understood that the above examples are illustrative, and therefore should not be construed as being limiting in any way.

From operation 304, the method 300 can proceed to operation 306. At operation 306, the server computer 112 can obtain a viewer history. The viewer history obtained in operation 306 can correspond, in some embodiments, to a number of viewers and/or demographic information for views of content previously captured and/or created by the user 134 and/or the user device 102. In some other embodiments, the viewer history obtained in operation 306 can correspond to a viewership history associated with a particular genre of content (e.g., a genre in which this particular project 136 can be categorized). Thus, the viewer history can provide information that may be used to estimate an audience for the project 136 including, for example, demographics of the audience, number of viewers, location of viewers, etc. In some embodiments, the viewer history can be used to modify the media content 126 based on locale (e.g., to remove language considered offensive in some locales, to change stories based on locale, combinations thereof, or the like). Thus, the viewer history can be used to make changes (or suggestions for changes) to the project 136.

The viewer history obtained in operation 306 can be provided by the recipient 138 and/or other entities (e.g., media services, social networking services, video services, combinations thereof, or the like). The viewer history can be provided as ratings information, tables, or in other formats and can be analysis by the content capture application 108 and/or the content capture service 110 to determine the associated viewer history, if desired. Regardless of how the viewer history is obtained, it can be appreciated that the viewer history can provide various considerations that may be used to alter a resolution of video captured for the project 136, to alter a frame rate of video captured for the project 136, to alter a time duration of the project 136, to alter quality of audio and/or video associated with the project 136, to expand and/or limit distribution of the project 136 (e.g., limiting and/or expanding the geographic distribution of the project 136, limiting and/or exploding an amount of time for which the project 136 is available, combinations thereof, or the like). Because the viewer history can be used for additional and/or alternative purposes, it should be understood that the above examples are illustrative, and therefore should not be construed as being limiting in any way.

From operation 306, the method 300 can proceed to operation 308. At operation 308, the server computer 112 can obtain a budget associated with the project 136. As explained above with reference to FIG. 1, the budget can be defined in terms of money, time, computing resources, location, people (and/or numbers of people), combinations thereof, or the like. In particular, the budget can be defined as a monetary budget for the project 136. Thus, the budget can define an amount of money that can be spent on the project 136 and/or on particular scenes of the project 136.

The budget also can define a time duration associated with the media project and/or an instance of media content 126. Thus, for example, the budget can define a maximum running time, a minimum running time, and/or a range of running times for the project 136 and/or instances of media content 126 associated with the project 136. Still further, the budget can define a computing resource budget for the project 136. The computer resource budget can include, for example, a minimum, maximum, average, and/or range of bandwidth available for communication (upload, download, streaming, etc.) of a particular instance of media content 126 and/or the project 136; processing capacity for use in processing the media content 126 and/or the project 136; data storage capacity for storing and/or caching the media content 126 and/or the project 136; combinations thereof; or the like.

Additionally, budget can be defined by location data such as, for example, a maximum or minimum number of locations at which media content 126 associated with the project 136 can be captured, amounts of time that can be spent at particular locations, locations at which media content 126 must (or cannot) be captured, combinations thereof, or the like. Budget also can be defined by people and/or numbers of people such as, for example, a number of people (maximum, minimum, and/or ranges) that can or must appear in media content 126 associated with the project 136, specific people that must (or cannot) appear in the media content 126 and/or the project 136, combinations thereof, or the like. Because other information can be used to define one or more aspects of a media project, it should be understood that the above examples are illustrative, and therefore should not be construed as being limiting in any way.

From operation 308, the method 300 can proceed to operation 310. At operation 310, the server computer 112 can perform an analysis on the information obtained in operations 302-310. This analysis in operation 310 can be performed, for example, to determine the project definitions 116. It therefore can be appreciated that the project definitions 116 can be based on locations associated with the project 136, text and/or scripts associated with the project 136, viewer history associated with the user 134 and/or the user device 102, one or more budget constraints, and the like. Thus, in operation 310, the server computer 112 can analyze the various types of information obtained in operations 302-310 and determine, based on this analysis, various aspects of the project 136 such as, for example, a location to be featured in the project 136, a location at which the project 136 is to be viewed, changes that should be made to the project 136 based on location of viewership and/or creation (e.g., textual changes, subject matter changes, etc.), text and/or spoken words that should be captured as part of the project 136, viewer history and/or anticipated audiences for the project 136, budgets associated with the project 136, combinations thereof, or the like. Thus, it can be appreciated that in operation 310, the server computer 112 can determine and/or output the project definitions 116.

Although not shown separately in FIG. 3, it should be understood that the server computer 112 also can obtain other information 130 and can analyze that information as well. For example, the server computer 112 can obtain contextual information to determine an audience for the project 136, a device that will be used to view the project 136, and/or other contextual information that may inform how the media content 126 should be captured. By way of example, a capture suggestion 122 may inform the user 134 to get closer to the target of the media content 126 based on a contextual determination that indicates that the audience will be viewing the media content 126 (or the project 136) on a device with a small screen, and a similar determination that the current viewing distance will make the target difficult to see on that device. As such, it should be understood that the analysis of operation 310 also can include analyzing other information 130 such as audience information, context information, combinations thereof, or the like. It should be understood that this example is illustrative, and therefore should not be construed as being limiting in any way.

From operation 310, the method 300 can proceed to operation 312. The method 300 can end at operation 312. It can be appreciated that through performance of the method 300, the project definitions 116 can be determined and that the method 200 can proceed from operation 202 if the method 300 is performed in association with the performance of operation 202 in the method 200. It should be understood that this example is illustrative, and therefore should not be construed as being limiting in any way.

Figure 4:
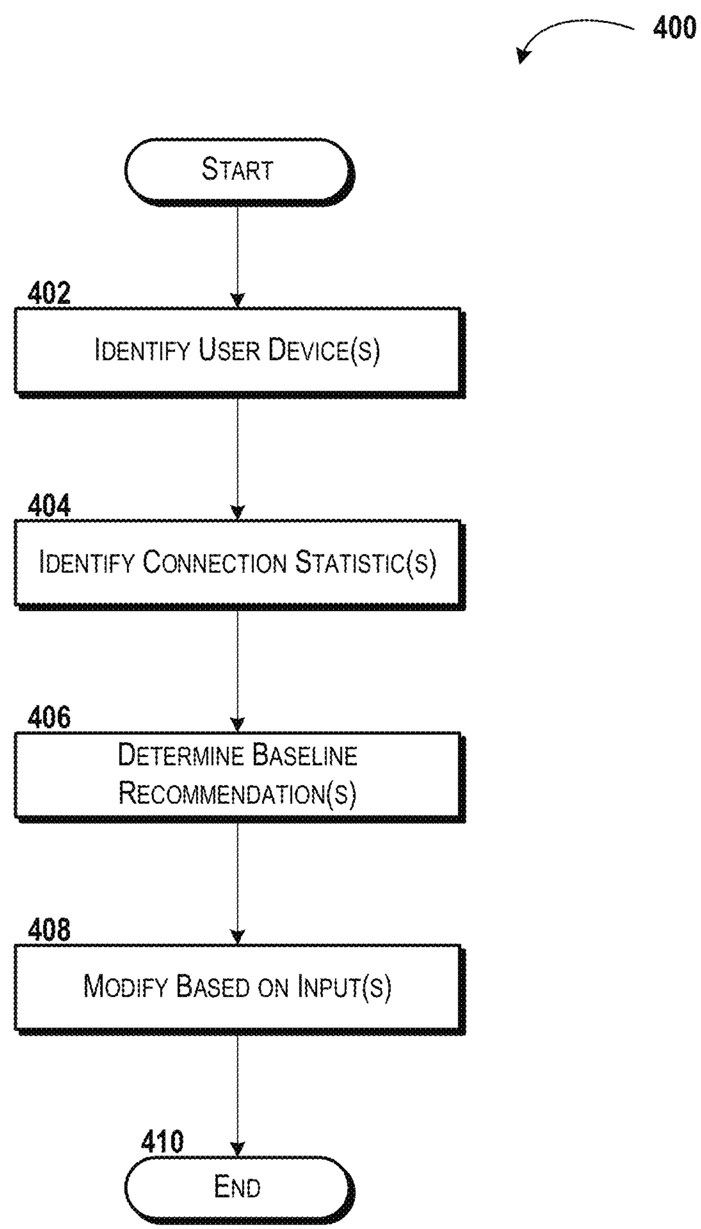
FIG. 4 is a flow diagram showing aspects of a method for determining device capabilities, according to an illustrative embodiment of the concepts and technologies described herein.

Turning now to FIG. 4, aspects of a method 400 for determining device capabilities will be described in detail, according to an illustrative embodiment. For purposes of illustrating and describing the concepts of the present disclosure, the method 400 is described herein as being performed by the server computer 112 via execution of one or more software modules such as, for example, the content capture service 110. It should be understood that additional and/or alternative devices and/or network nodes can provide the functionality described herein via execution of one or more modules, applications, and/or other software including, but not limited to, the content capture service 110. For example, as explained above with reference to FIG. 1, the functionality of the content capture service 110 can be incorporated into the content capture application 108, and as such, the user device 102 can perform the operations described herein, in some embodiments. Thus, the illustrated embodiment of the method 400 should be understood as being illustrative, and should not be viewed as being limiting in any way.

The method 400 begins at operation 402. At operation 402, the server computer 112 can identify one or more user devices (e.g., the user device 102), for example, devices that are to be used to capture the media content 126 associated with the project 136. Thus, in operation 402, the server computer 112 can identify one or more user devices that are to be used to capture content (e.g., the media content 126), one or more user devices that are to be used to obtain user input data 124 (e.g., texts and/or scripts associated with the project 136, targets and/or scenes associated with the project 136, locations at which content is to be captured for the project 136, etc.), and/or one or more user devices that are to be used to create the project 136. In the content of FIG. 1, it can be appreciated that operation 402 can correspond to identifying the user device 102. It should be understood that this example is illustrative, and therefore should not be construed as being limiting in any way.

The devices can be identified in operation 402 by detecting what device is communicating with the server computer 112, by identifying the user 134 and his or her associated user devices, by accessing settings and/or preferences associated with the user device 102 and/or the server computer 112, and/or in other manners. In some embodiments, the user 134 may explicitly identify the user device 102 as being used to create the project 136. Because the user device 102 and/or other devices that are to be used to capture media content 126 and/or otherwise associated with the creation of the project 136 can be identified in additional and/or alternative manners, it should be understood that the above examples are illustrative, and therefore should not be construed as being limiting in any way.

From operation 402, the method 400 can proceed to operation 404. At operation 404, the server computer 112 can identify one or more connection statistics associated with one or more communication channels 132 between the user device 102 and a recipient 138, between the server computer 112 and the recipient 138, between the server computer 112 and the user device 102, and/or other communication channels 132. It should be appreciated that in some embodiments, the server computer 112 (or the user device 102) can perform operation 404 by obtaining, from the network monitor 140, the network data 142. It should be understood that this example is illustrative, and therefore should not be construed as being limiting in any way.

In some embodiments, operation 404 can include the server computer 112 identifying one or more communication channels 132 that will be used during creation and/or providing of the project 136, and determining, for the identified communication channels 132, one or more connection statistic(s) associated with those connection(s). The connection statistics can be determined in a number of manners such as, for example, querying a network reporting device, performing ping tests and/or connection tests, performing test communications with the user device 102 and/or other devices, combinations thereof, or the like. Because other manners of obtaining connection statistics for a communication channel 132 can be utilized in association with embodiments of the concepts and technologies disclosed herein, it should be understood that these examples are illustrative, and therefore should not be construed as being limiting in any way.

From operation 404, the method 400 can proceed to operation 406. At operation 406, the server computer 112 can determine one or more baseline recommendations for the user device 102 or other device(s) being used to capture media content 126 associated with the project 136. The baseline recommendations determined in operation 406 can be based on preferences, settings, and/or known qualities or characteristics for a particular user device 102. Thus, the baseline recommendations can be based on past performance and/or recommended performance levels. The term "baseline," however, is used to indicate that these recommendations are merely a suggested and can be modified by a user 134 or other entity (e.g., via the submission of user input data 124 as illustrated and described herein). As such, the baseline recommendations may be a minimum in some embodiments, but this is not necessarily the case as in some instances, a user may modify the device capabilities 120 below a recommended baseline. It should be understood that this example is illustrative, and therefore should not be construed as being limiting in any way.

According to various embodiments of the concepts and technologies disclosed herein, the baseline recommendations determined in operation 406 can represent, inter alia, a video resolution for media content 126 captured as part of the project 136 and/or for the project 136; a video resolution for media content 126 captured as part of the project 136 and/or for the project 136; a video frame rates for media content 126 captured as part of the project 136 and/or for the project 136; an audio sampling rate for audio captured as part of the project 136 and/or for the project 136; a frequency range for audio captured as part of the project 136 and/or for the project 136; codecs and/or formats that are to be used for the media content 126 captured as part of the project 136 and/or for the project 136; data transfer rates and/or communications channels to be used to transmit and/or receive media content 126 and/or the project 136; combinations thereof; or the like. Because other baseline recommendations can be made in operation 406, it should be understood that the above-listed examples are illustrative, and therefore should not be construed as being limiting in any way.

From operation 406, the method 400 can proceed to operation 408. At operation 408, the server computer 112 can modify the baseline recommendations determined in operation 406 based on input (e.g., from the user 134 or other entity, based on settings, based on preferences, combinations thereof, or the like). Thus, for example, a baseline recommendation may recommend a frame rate of thirty frames for media content 126 captured as part of the project 136 and/or for the project 136. User preferences and/or input can modify this baseline recommendation up or down (e.g., to twenty frames per second, sixty frames per second, or other frame rates). Thus, in operation 408 it should be understood that the server computer 112 or other entity can query a user 134 (e.g., via communications via the user device 102) to adjust one or more baseline recommendations; and obtain input from the user relating to these baseline recommendations. Because changes to the baseline recommendations can be obtained in additional and/or alternative manners, it should be understood that this example is illustrative, and therefore should not be construed as being limiting in any way.

From operation 408, the method 400 can proceed to operation 410. The method 400 can end at operation 410. It can be appreciated that through performance of the method 400, the device capabilities 120 can be determined (as adjusted in operation 408, if desired), and that the method 200 can proceed from operation 204 if the method 400 is performed in association with the performance of operation 204 in the method 200. It should be understood that this example is illustrative, and therefore should not be construed as being limiting in any way.

Figure 5A:
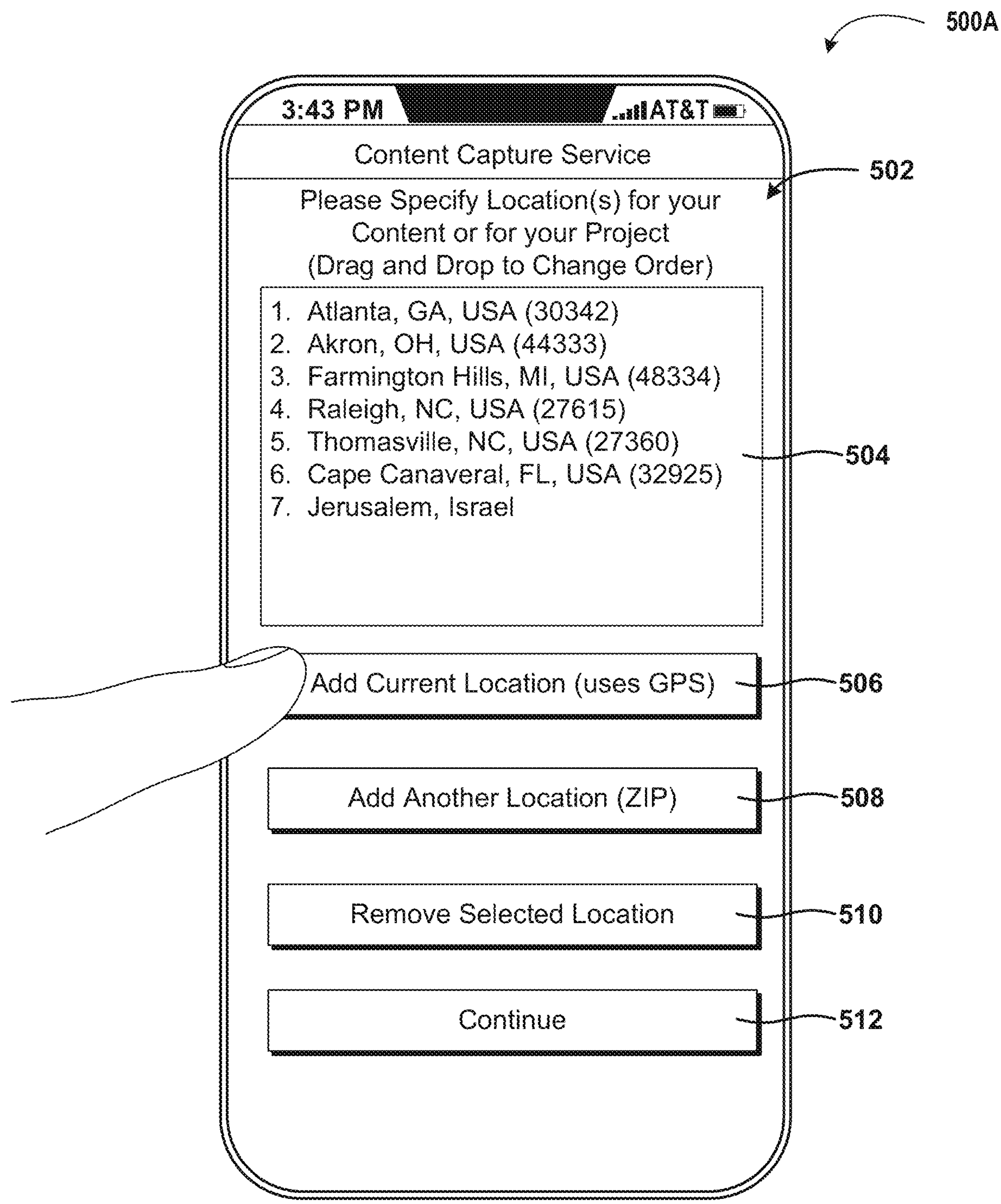
FIGS. 5A-5L are user interface diagrams showing various screen displays for interacting with a content capture application and/or content capture service, according to some illustrative embodiments of the concepts and technologies described herein.

FIGS. 5A-5L are user interface ("UI") diagrams showing aspects of UIs for using and/or interacting with the content capture application 108 and/or the content capture service 110, according to some illustrative embodiments of the concepts and technologies disclosed herein. FIG. 5A shows an illustrative screen display 500A. According to some embodiments of the concepts and technologies described herein, the screen display 500A can be generated by a device such as the user device 102 via interactions with the content capture service 110 and/or the content capture application 108. In particular, according to various embodiments, the user device 102 can generate the screen display 500A and/or other screen displays in conjunction with and/or based upon interactions with the content capture application 108 described herein, which can be configured to render the screen display 500A using data generated at the user device 102 and/or using data provided by the content capture service 110. It should be appreciated that the UI diagram illustrated in FIG. 5A is illustrative of one contemplated example of the UIs that can be generated and/or displayed in accordance with the concepts and technologies disclosed herein, and therefore should not be construed as being limited in any way.

According to various embodiments, the screen display 500A can be presented, for example, to obtain location information and/or at submission of project definition data 118 as illustrated and described herein with respect to operations 202 and 302 of the methods 200 and 300 shown in FIGS. 2 and 3. For example, a user 134 or other entity may select an option to add locations associated with a project 136 and/or may be prompted to submit location information. Because the screen display 500A illustrated in FIG. 5A (and/or other screen displays for obtaining location information) can be displayed at additional and/or alternative times, it should be understood that the above examples are illustrative and therefore should not be construed as being limiting in any way.

The screen display 500A can include various menus and/or menu options (not shown in FIG. 5A). The screen display 500A also can include a location information submission window 502. The location information submission window 502 can be configured to enable a user 134 or other entity to add locations associated with a project 136 and/or media content 126. The location information submission window 502 can include a location list field 504. The location list field 504 can provide a listing of all location information associated with a particular project 136. The order of the locations can be changed, in some embodiments, by dragging and dropping locations within the location list field 504, though this is not necessarily the case. In the illustrated embodiment, the location list field 504 includes seven locations associated with a project 136. These locations may have been entered by a user 134 or other entity, as will be more clearly understood with reference to the additional elements of the screen display 500A. At any rate, it should be understood that the example embodiment is illustrative and therefore should not be construed as being limiting in any way.

As shown in FIG. 5A, the location information submission window 502 also includes a UI control 506. Selection of the UI control 506 can cause the user device 102 to determine its current location (e.g., by accessing an onboard or off-board GPS device or other location device) and to add the determined location to the location list field 504. It should be understood that this example is illustrative and therefore should not be construed as being limiting in any way.

The location information submission window 502 also can include a UI control 508 to add another location to the location list field 504. Selection of the UI control 508 can cause the user device 102 to present a text field, map, or other field or interface for adding another location. In the illustrated embodiment, the UI control 508 causes the user device to present a text field for entry of a ZIP code. It should be understood that this example is illustrative, and therefore should not be construed as being limiting in any way.

The location information submission window 502 also can include a UI control 510 to remove a highlighted location from the location list field 504. Thus, for example, the user 134 or other entity can select a location in the location list field 504 and select the UI control 510 to cause the user device 102 to remove the selected location from the location list field 504. The location information submission window 502 also can include a UI control 512 to accept the locations listed in the location list field 504, to continue to other interfaces, to exit the location submission functionality, and/or to otherwise complete the location submission functionality illustrated and described herein. Because additional or alternative controls can be included in the location information submission window 502, it should be understood that the example embodiment shown in FIG. 5A is illustrative and therefore should not be construed as being limiting in any way.

Figure 5B:
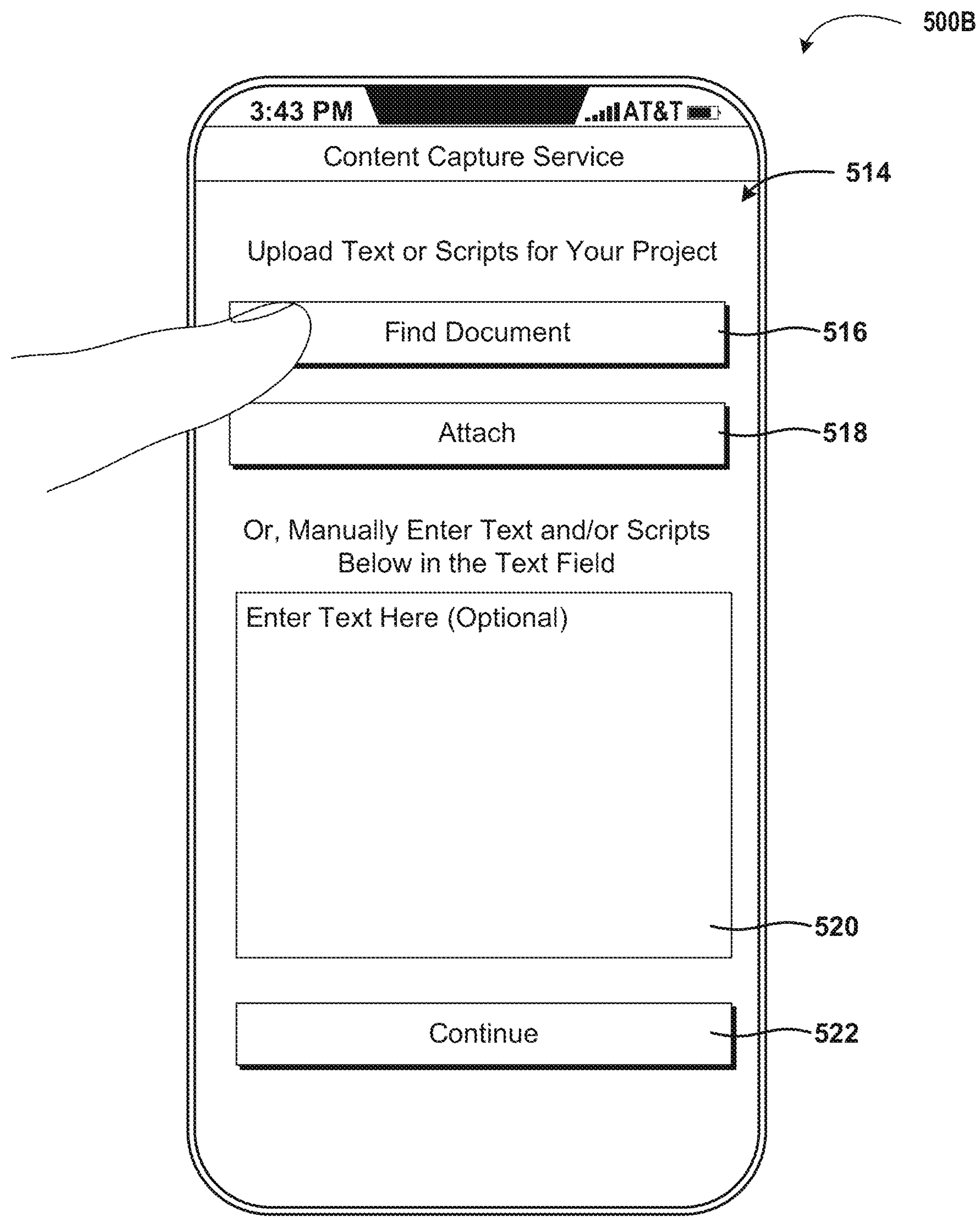

FIG. 5B shows an illustrative screen display 500B. According to some embodiments of the concepts and technologies described herein, the screen display 500B can be generated by a device such as the user device 102 via interactions with the content capture service 110 and/or the content capture application 108. In particular, according to various embodiments, the user device 102 can generate the screen display 500B and/or other screen displays in conjunction with and/or based upon interactions with the content capture application 108 described herein, which can be configured to render the screen display 500B using data generated at the user device 102 and/or using data provided by the content capture service 110. It should be appreciated that the UI diagram illustrated in FIG. 5B is illustrative of one contemplated example of the UIs that can be generated and/or displayed in accordance with the concepts and technologies disclosed herein, and therefore should not be construed as being limiting in any way.

According to various embodiments, the screen display 500B can be presented, for example, to obtain text and/or scripts as illustrated and described herein with respect to operation 304 of the method 300 shown in FIG. 3. For example, a user 134 or other entity may select an option to add a text or script associated with a project 136 and/or may be prompted to submit such text and/or scripts. Because the screen display 500B illustrated in FIG. 5B (and/or other screen displays for obtaining text or script information) can be displayed at additional and/or alternative times, it should be understood that the above examples are illustrative and therefore should not be construed as being limiting in any way.

The screen display 500B can include various menus and/or menu options (not shown in FIG. 5B). The screen display 500B also can include a text or script submission window 514. The text or script submission window 514 can be configured to enable a user 134 or other entity to add a text or script associated with a project 136 and/or media content 126. The text or script submission window 514 can include a UI control 516 to locate or find a document with text or script information associated with the project 136 (e.g., a document having the text associated with the project 136 and/or a document having a script associated with the project 136). In response to detecting a selection of the UI control 516, the user device 102 can provide a search interface to locate a document from a file storage location, a file storage service, or other local or remote data storage location or service.

As shown in FIG. 5B, the text or script submission window 514 also includes a UI control 518. Selection of the UI control 518 can cause the user device 102 to attach the document found or located using the UI control 516 so that it can be submitted, uploaded, transmitted, or otherwise used (e.g., used locally). It can be appreciated that the UI control 518 can cause the user device 102 to take any action needed to make the text or script available to the content capture application 108 and/or the content capture service 110. The text or script submission window 514 also can include a text field 520. The text field 520 can be used to allow a user 134 or other entity to enter text or a script (e.g., if no text or script file exists). Thus, embodiments of the concepts and technologies disclosed herein support creating a script or text document. It should be understood that this example is illustrative, and therefore should not be construed as being limiting in any way.

The text or script submission window 514 also can include a UI control 522 to accept the script or text file attached, or the text or script entered, to continue to other interfaces, to exit the text or script submission functionality, and/or to otherwise complete the text or script submission functionality illustrated and described herein. Because additional or alternative controls can be included in the text or script submission window 514, it should be understood that the example embodiment shown in FIG. 5B is illustrative and therefore should not be construed as being limiting in any way.

Figure 5C:
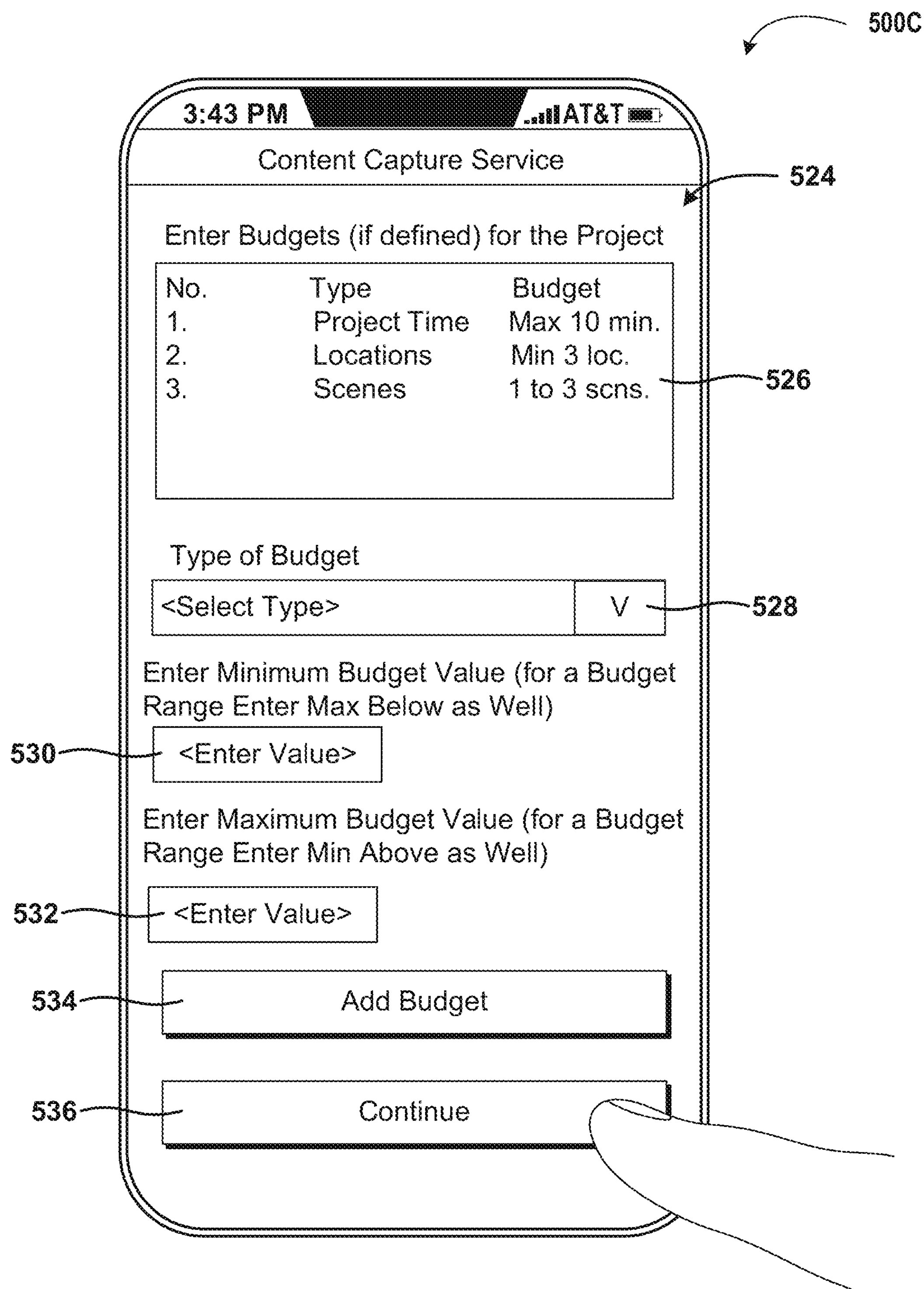

FIG. 5C shows an illustrative screen display 500C. According to some embodiments of the concepts and technologies described herein, the screen display 500C can be generated by a device such as the user device 102 via interactions with the content capture service 110 and/or the content capture application 108. In particular, according to various embodiments, the user device 102 can generate the screen display 500C and/or other screen displays in conjunction with and/or based upon interactions with the content capture application 108 described herein, which can be configured to render the screen display 500C using data generated at the user device 102 and/or using data provided by the content capture service 110. It should be appreciated that the UI diagram illustrated in FIG. 5C is illustrative of one contemplated example of the UIs that can be generated and/or displayed in accordance with the concepts and technologies disclosed herein, and therefore should not be construed as being limited in any way.

According to various embodiments, the screen display 500C can be presented, for example, to obtain one or more budgets as illustrated and described herein with respect to operation 308 of the method 300 shown in FIG. 3. For example, a user 134 or other entity may select an option to add a budget associated with a project 136 and/or may be prompted to submit such a budget. Because the screen display 500C illustrated in FIG. 5C (and/or other screen displays for obtaining budget information) can be displayed at additional and/or alternative times, it should be understood that the above examples are illustrative and therefore should not be construed as being limiting in any way.

The screen display 500C can include various menus and/or menu options (not shown in FIG. 5C). The screen display 500C also can include a budget entry window 524. The budget entry window 524 can be configured to enable a user 134 or other entity to add or define one or more budgets associated with a project 136 and/or media content 126. The budget entry window 524 can include a budget field 526. The budget field 526 can list all budgets associated with the project 136. As explained herein, a budget for a project 136 can include, for example, a monetary budget, a location budget, a time budget, a person budget, a scene budget, a file size budget, and/or other budgets. As such, the illustrated budgets are merely illustrative and should not be construed as being limiting in any way.

As shown in FIG. 5C, the budget entry window 524 also includes various interface elements for adding a budget to the project 136. Although not illustrated in FIG. 5C, it can be appreciated that the budget entry window 524 can also include a remove budget option whereby a user 134 or other entity can select a budget and select the remove budget option to remove the selected budget from the budget entry window 524 (similar to the remove location option discussed with reference to FIG. 5A). It should be understood that this example is illustrative, and therefore should not be construed as being limiting in any way.

The budget entry window 524 can include a UI control 528. The UI control 528 is illustrated as a drop-down box to select a type of budget, though this is not necessarily the case. Selection of the UI control 528 can cause the user device 102 to present a menu of the types of budgets available so that the budget parameters and/or ranges can be set via the text fields 530, 532 if desired. In the illustrated embodiment, if a value is put in only one text field (e.g., the text field 530), the budget can be defined as a minimum number only (via text entry in the text field 530), a maximum number only (via text entry in the text field 532), or as a range (via text entry in both text fields 530, 532). It should be understood that this example is illustrative, and therefore should not be construed as being limiting in any way.

Once budget parameter(s) are set, selection of the UI control 534 can cause the user device 102 to add the budget to the budget field 526. The budget entry window 524 also can include a UI control 536 to accept the budgets as entered, to continue to other interfaces, to exit the budget submission functionality, and/or to otherwise complete the budget submission functionality illustrated and described herein. Because additional or alternative controls can be included in the budget entry window 524, it should be understood that the example embodiment shown in FIG. 5C is illustrative and therefore should not be construed as being limiting in any way.

Figure 5D:
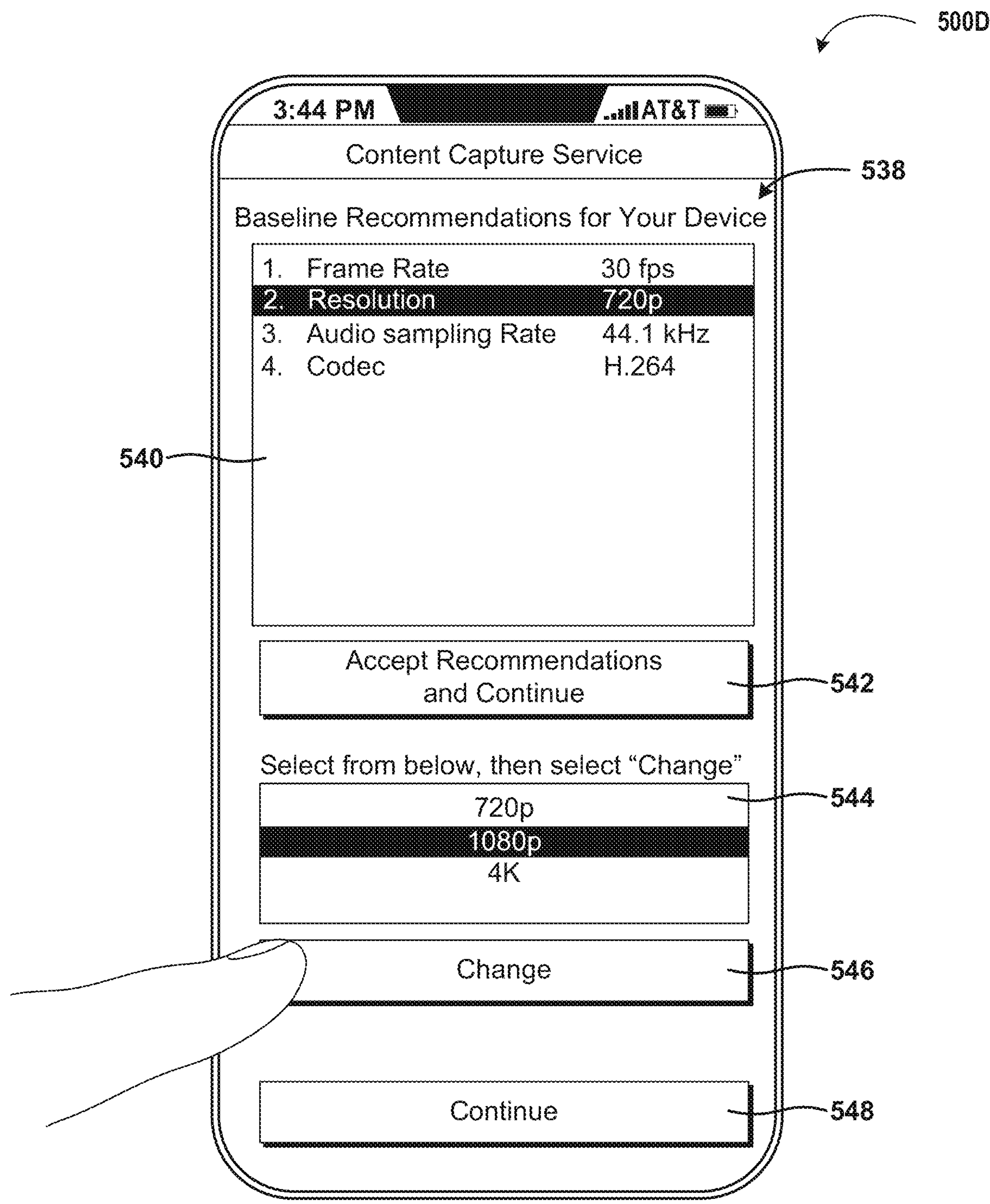

FIG. 5D shows an illustrative screen display 500D. According to some embodiments of the concepts and technologies described herein, the screen display 500D can be generated by a device such as the user device 102 via interactions with the content capture service 110 and/or the content capture application 108. In particular, according to various embodiments, the user device 102 can generate the screen display 500D and/or other screen displays in conjunction with and/or based upon interactions with the content capture application 108 described herein, which can be configured to render the screen display 500D using data generated at the user device 102 and/or using data provided by the content capture service 110. It should be appreciated that the UI diagram illustrated in FIG. 5D is illustrative of one contemplated example of the UIs that can be generated and/or displayed in accordance with the concepts and technologies disclosed herein, and therefore should not be construed as being limited in any way.

According to various embodiments, the screen display 500D can be presented, for example, to present and/or to enable modification of one or more baseline recommendations as illustrated and described herein with respect to operations 406-408 of the method 400 shown in FIG. 4. For example, a user 134 or other entity may select an option to view baseline recommendations, the baseline recommendations can be surfaced to the user 134 or other entity, and/or the user 134 or other entity may select an option to modify baseline recommendations. Because the screen display 500D illustrated in FIG. 5D (and/or other screen displays for presenting and/or modifying baseline recommendations) can be displayed at additional and/or alternative times, it should be understood that the above examples are illustrative and therefore should not be construed as being limiting in any way.

The screen display 500D can include various menus and/or menu options (not shown in FIG. 5D). The screen display 500D also can include a baseline recommendation view and modification window 538. The baseline recommendation view and modification window 538 can be configured to enable a user 134 or other entity to view and/or modify the baseline recommendations as noted above for a project 136 and/or media content 126. The baseline recommendation view and modification window 538 can include a baseline recommendations field 540. The baseline recommendations field 540 can list all baseline recommendations that are determined to be applicable to the project 136. Because many other baseline recommendations have been explained herein, it should be understood that the illustrated is merely illustrative and should not be construed as being limiting in any way.

As shown in FIG. 5D, the baseline recommendation view and modification window 538 can include a UI control 542 that, when selected, causes the user device 102 to accept the baseline recommendations as displayed and to continue to other user interfaces, processes, etc. The baseline recommendation view and modification window 538 also can include various interface elements for modifying a baseline recommendation for the project 136. In particular, a user 134 or other entity can select one of the baseline recommendations displayed in the baseline recommendations field 540. In response to selecting a baseline recommendation, the user device 102 can display all possible values (based on device capabilities) in the selection field 544. A user 134 or other entity can select one of the options displayed and select the UI control 546 to cause the user device 102 to change the baseline recommendation as indicated. Because other functionality for modifying the baseline recommendations is contemplated and is possible, it should be understood that this example is illustrative, and therefore should not be construed as being limiting in any way.

Once the baseline recommendations are accepted and/or modified as desired, selection of the UI control 548 can cause the user device 102 to accept the baseline recommendations as modified, to continue to other interfaces, to exit the baseline recommendation view and modification functionality, and/or to otherwise determine device capabilities 120 as illustrated and described herein. Because additional or alternative controls can be included in the baseline recommendation view and modification window 538, it should be understood that the example embodiment shown in FIG. 5D is illustrative and therefore should not be construed as being limiting in any way.

FIGS. 5E-5L show illustrative screen displays 500E-L. According to some embodiments of the concepts and technologies described herein, the screen displays 500E-L can be generated by a device such as the user device 102 via interactions with the content capture service 110 and/or the content capture application 108. In particular, according to various embodiments, the user device 102 can generate the screen displays 500E-L and/or other screen displays in conjunction with and/or based upon interactions with the content capture application 108 described herein, which can be configured to render the screen display 500E using data generated at the user device 102 and/or using data provided by the content capture service 110. It should be appreciated that the UI diagrams illustrated in FIGS. 5E-L are illustrative of some contemplated examples of the UIs that can be generated and/or displayed in accordance with the concepts and technologies disclosed herein, and therefore should not be construed as being limiting in any way.

According to various embodiments, the screen displays 500E-L can be presented, for example, to present one or more capture suggestions 122 as illustrated and described herein with respect to operation 208 of the method 200 shown in FIG. 2. Because the screen displays 500E-L illustrated in FIGS. 5E-L (and/or other screen displays for providing capture suggestions 122) can be displayed at additional and/or alternative times, it should be understood that the above example is illustrative and therefore should not be construed as being limiting in any way.

Figure 5E:
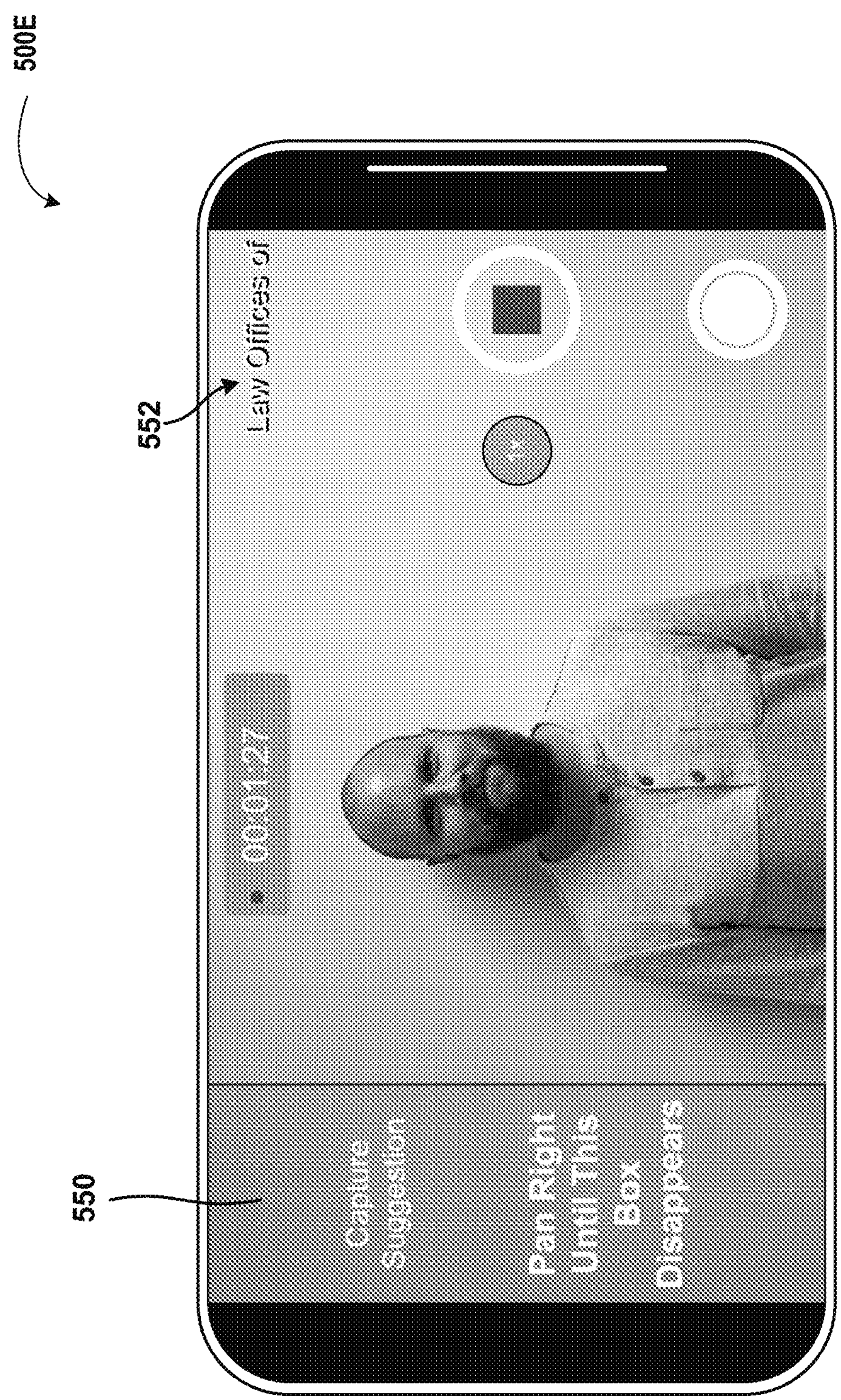

The screen display 500E illustrated in FIG. 5E shows a content capture screen (e.g., a video recorder application screen) with an overlay 550 that corresponds to a capture suggestion 122. In the illustrated embodiment, an advertisement 552 is visible on the wall in the video, but the text is cut off by the edges of the video. As such, the capture suggestion 122 can suggest to the user 134 or other entity that the video should be panned to the right so that the text associated with the advertisement is visible in the video being captured. In the illustrated embodiment, as the video is panned right, the overlay 550 will be panned off the left side of the screen, thereby progressively disappearing and thereby passively instructing the user 134 or other entity when to stop panning (active instructions to stop panning are also possible and are contemplated). Because many embodiments for providing the overlay 550 and/or for providing a UI that suggests to a user that the view should be panned are contemplated and are possible, it should be understood that the illustrated embodiment is merely illustrative and should not be construed as being limiting in any way.

Figure 5F:
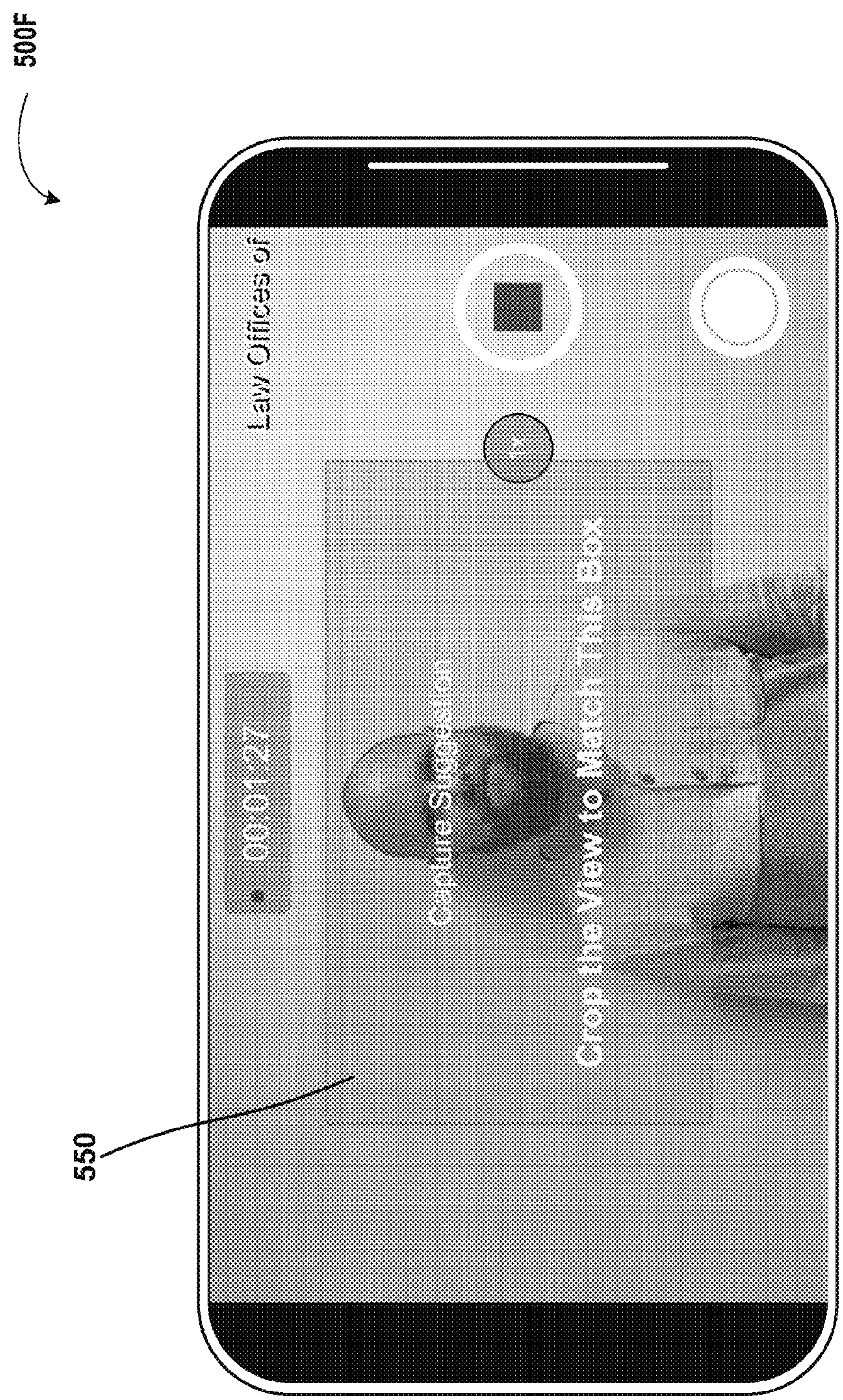

The screen display 500F illustrated in FIG. 5F shows a content capture screen (e.g., a video recorder application screen) with another embodiment of the overlay 550 that corresponds to a capture suggestion 122. In the illustrated embodiment, the capture suggestion 122 can suggest to the user 134 or other entity that the video view should be cropped to match the displayed overlay 550. It should be appreciated that the capture suggestion 122 could recommend zooming as well to achieve a similar effect, but in this case the cropping is preferred (for example, because the optical and/or digital zoom may already be applied to the video, or for other reasons). As the view is cropped (e.g., by the user 134 or other entity moving closer to the subject of the media content 126), the overlay 550 can expand until the overlay 550 matches the viewable space of the screen (at which time the overlay 550 may disappear and/or become more transparent, for example). Because many embodiments for providing the overlay 550 and/or for providing a UI that suggests to a user that the view should be cropped are contemplated and are possible, it should be understood that the illustrated embodiment is merely illustrative and should not be construed as being limiting in any way.

Figure 5G:
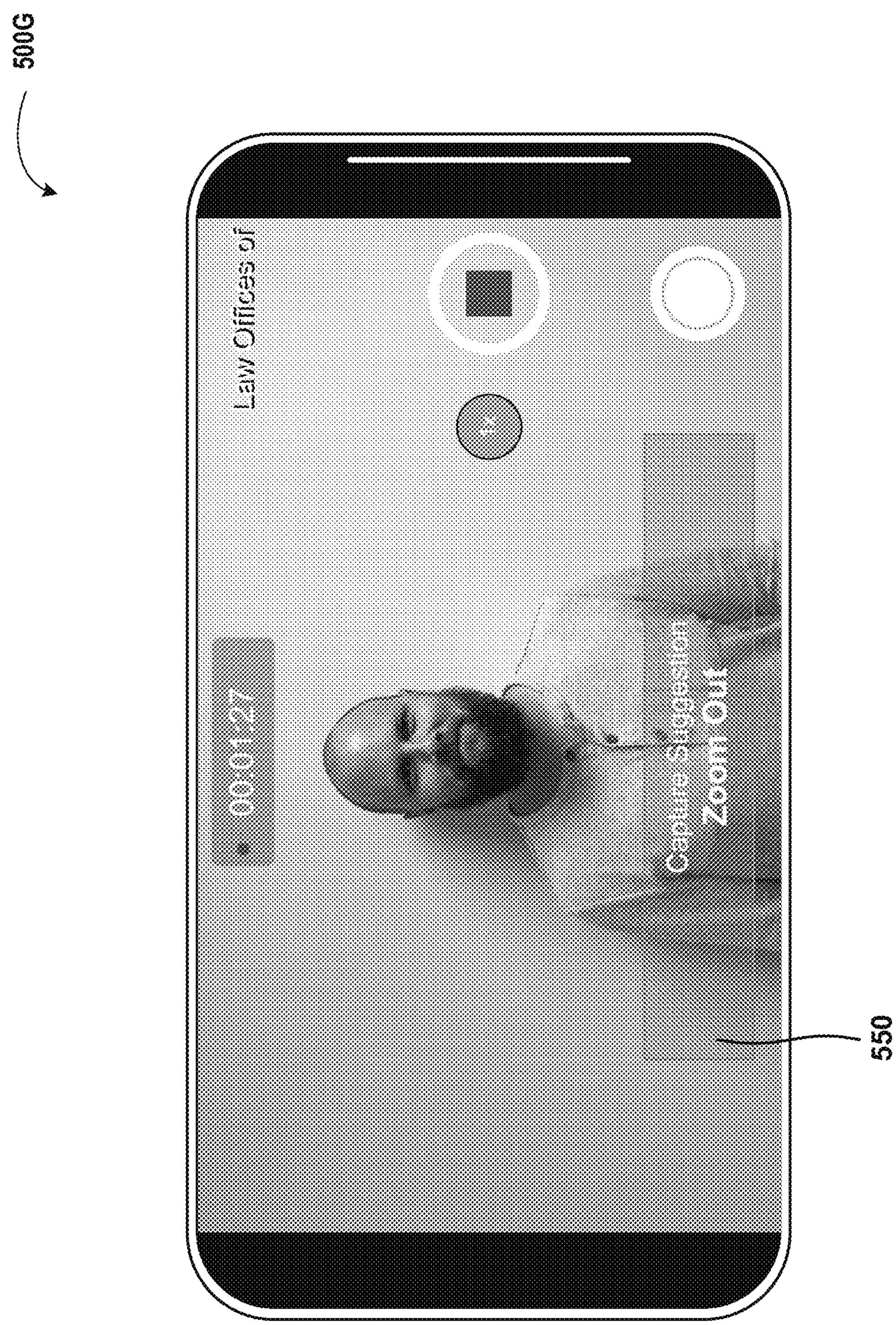

The screen display 500G illustrated in FIG. 5G shows a content capture screen (e.g., a video recorder application screen) with another embodiment of the overlay 550 that corresponds to a capture suggestion 122. In the illustrated embodiment, the capture suggestion 122 can suggest to the user 134 or other entity that the video view should be zoomed out. It should be appreciated that the capture suggestion 122 could recommend moving away from the target of the video to achieve a similar effect, but in this case the zooming is preferred (for example, because the optical and/or digital zoom may be in use or for other reasons). As the view is zoomed to the suggested zoom level, the overlay 550 may disappear and/or become more transparent. Because many embodiments for providing the overlay 550 and/or for providing a UI that suggests to a user that the view should be zoomed out are contemplated and are possible, it should be understood that the illustrated embodiment is merely illustrative and should not be construed as being limiting in any way.

Figure 5H:
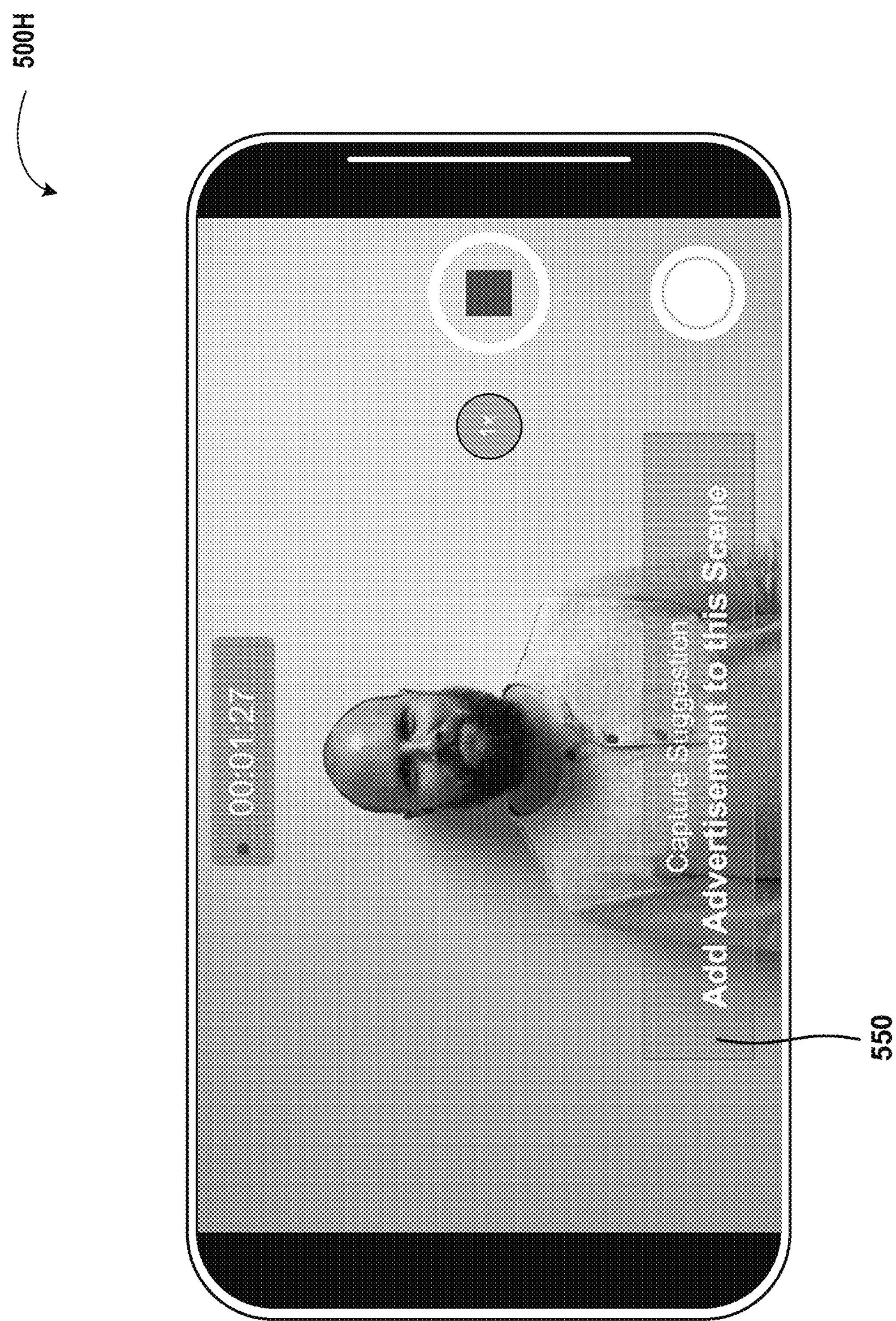

The screen display 500H illustrated in FIG. 5H shows a content capture screen (e.g., a video recorder application screen) with another embodiment of the overlay 550 that corresponds to a capture suggestion 122. In the illustrated embodiment, the capture suggestion 122 can suggest to the user 134 or other entity that an advertisement should be added to the media content 126. In some embodiments, the overlay 550 can enable text entry via selection of the overlay 550, via which advertising text or images can be added to the video, but this is not separately illustrated in FIG. 5H. Because many embodiments for providing the overlay 550 and/or for providing a UI that suggests to a user that an advertisement should be added to a video or scene are contemplated and are possible, it should be understood that the illustrated embodiment is merely illustrative and should not be construed as being limiting in any way.

Figure 5I:
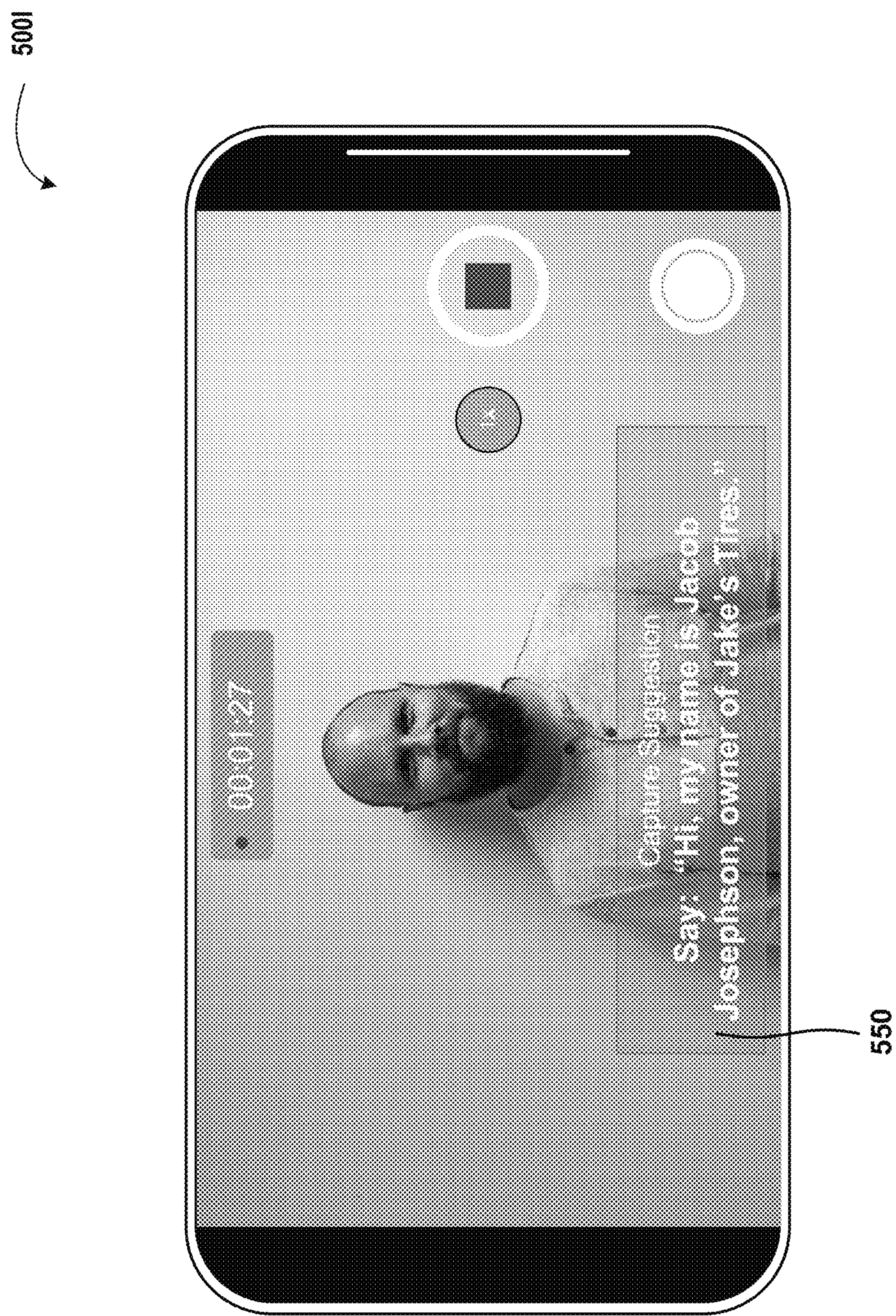

The screen display 500I illustrated in FIG. 5I shows a content capture screen (e.g., a video recorder application screen) with another embodiment of the overlay 550 that corresponds to a capture suggestion 122. In the illustrated embodiment, the capture suggestion 122 can suggest to the user 134 or other entity that certain text or script language should be said by the person in the video and/or otherwise should be added to the media content 126. In some embodiments, the overlay 550 can enable text entry via selection of the overlay 550, via which text can be added to the video (e.g., background information, time information, location information, story information, or the like), but this is not separately illustrated in FIG. 5I. Because many embodiments for providing the overlay 550 and/or for providing a UI that suggests to a user that text should be added to a video or scene are contemplated and are possible, it should be understood that the illustrated embodiment is merely illustrative and should not be construed as being limiting in any way.

Figure 5J:
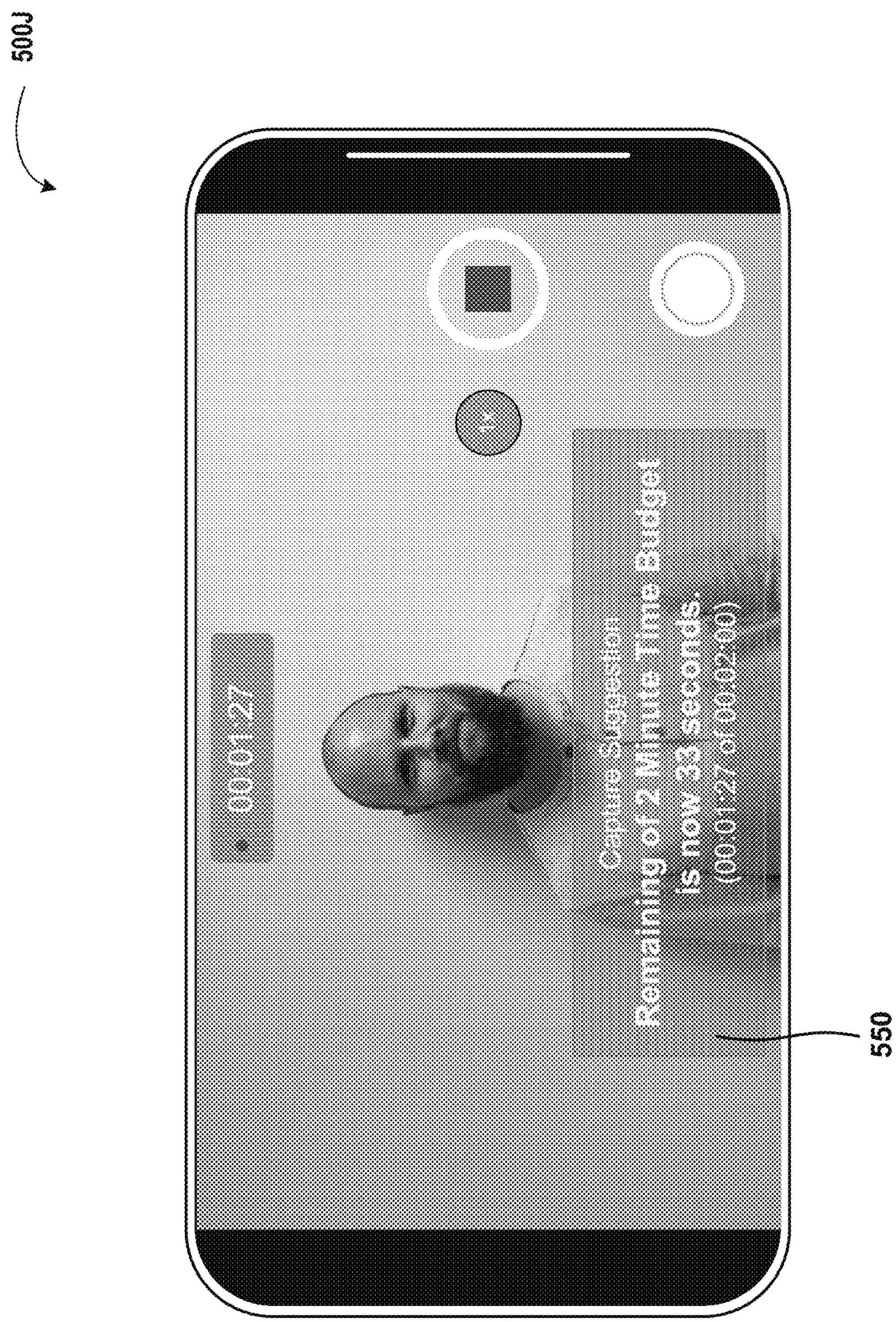

The screen display 500J illustrated in FIG. 5J shows a content capture screen (e.g., a video recorder application screen) with another embodiment of the overlay 550 that corresponds to a capture suggestion 122. In the illustrated embodiment, the capture suggestion 122 can inform the user 134 or other entity about a budget that applies to the project 136. In the illustrated embodiment, the overlay 550 can inform the user 134 or other entity that the time budget associated with the scene, media content 126, and/or project 136 is nearly exhausted (only slightly over 25% remaining). Because many embodiments for providing the overlay 550 and/or for providing a UI that informs a user regarding budgets are contemplated and are possible, it should be understood that the illustrated embodiment is merely illustrative and should not be construed as being limiting in any way.

Figure 5K:
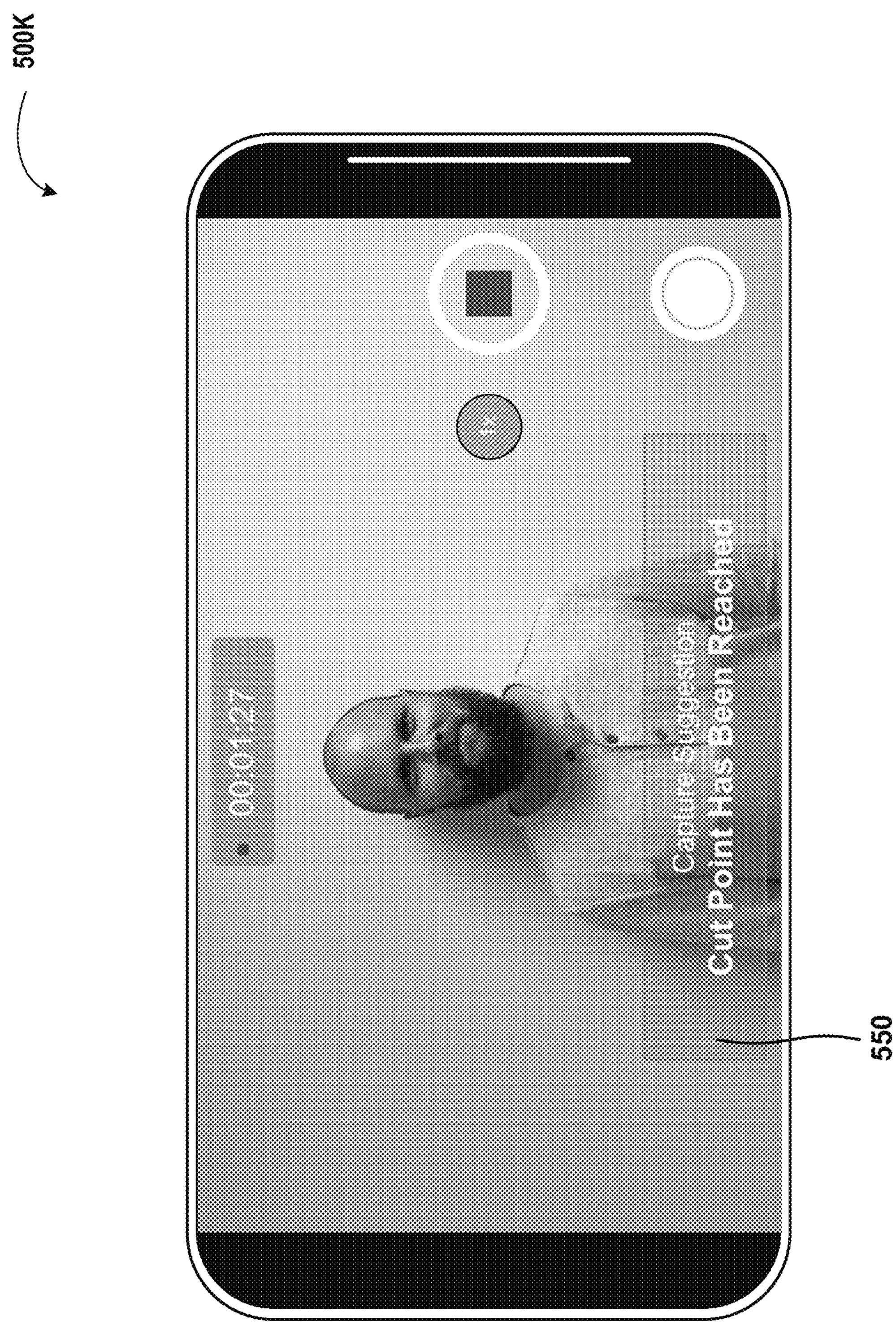

The screen display 500K illustrated in FIG. 5K shows a content capture screen (e.g., a video recorder application screen) with another embodiment of the overlay 550 that corresponds to a capture suggestion 122. In the illustrated embodiment, the capture suggestion 122 can inform the user 134 or other entity that a cut point has been reached, meaning that recording should be stopped at this time. As explained above, a cut point may be reached due to mood and/or continuity considerations, due to expiration or exhaustion of a budget, and/or for other reasons. Because many embodiments for providing the overlay 550 and/or for providing a UI that informs a user that a cut point has been reached are contemplated and are possible, it should be understood that the illustrated embodiment is merely illustrative and should not be construed as being limiting in any way.

Figure 5L:
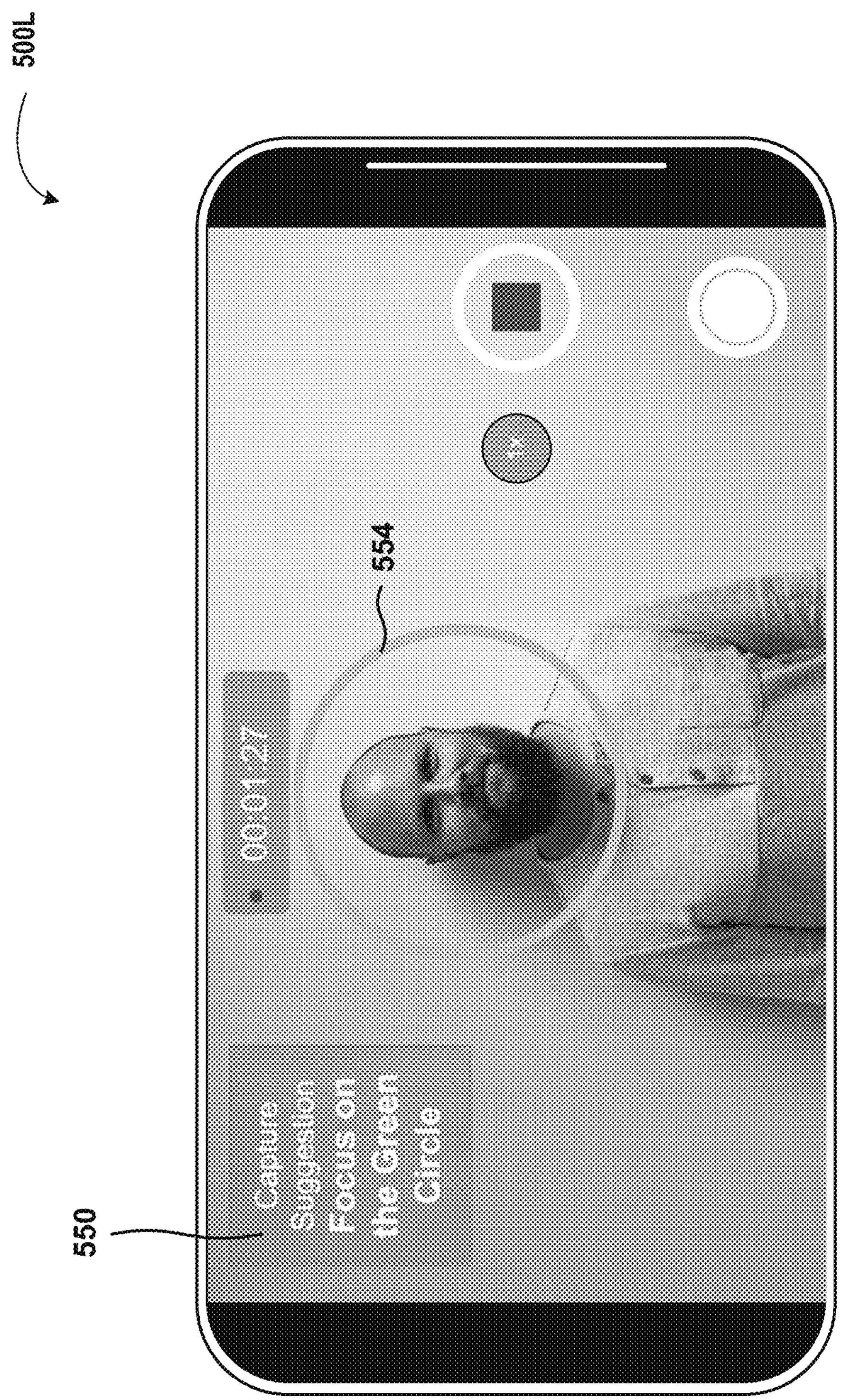

The screen display 500L illustrated in FIG. 5L shows a content capture screen (e.g., a video recorder application screen) with another embodiment of the overlay 550 that corresponds to a capture suggestion 122. In the illustrated embodiment, the capture suggestion 122 can inform the user 134 or other entity that a particular target should be focused on during capture of the media content 126. Additionally, a focus circle 554 can be presented on the screen to indicate the point, object, or other entity that should be focused on during the capture of the media content 126. Because many embodiments for providing the overlay 550 and/or a focus circle 554 (or other shape such as an "x", a dot, a box, guidelines, etc.) for providing a UI that informs a user about the object, person, or other entity to focus on are contemplated and are possible, it should be understood that the illustrated embodiment is merely illustrative and should not be construed as being limiting in any way.

Figure 6:
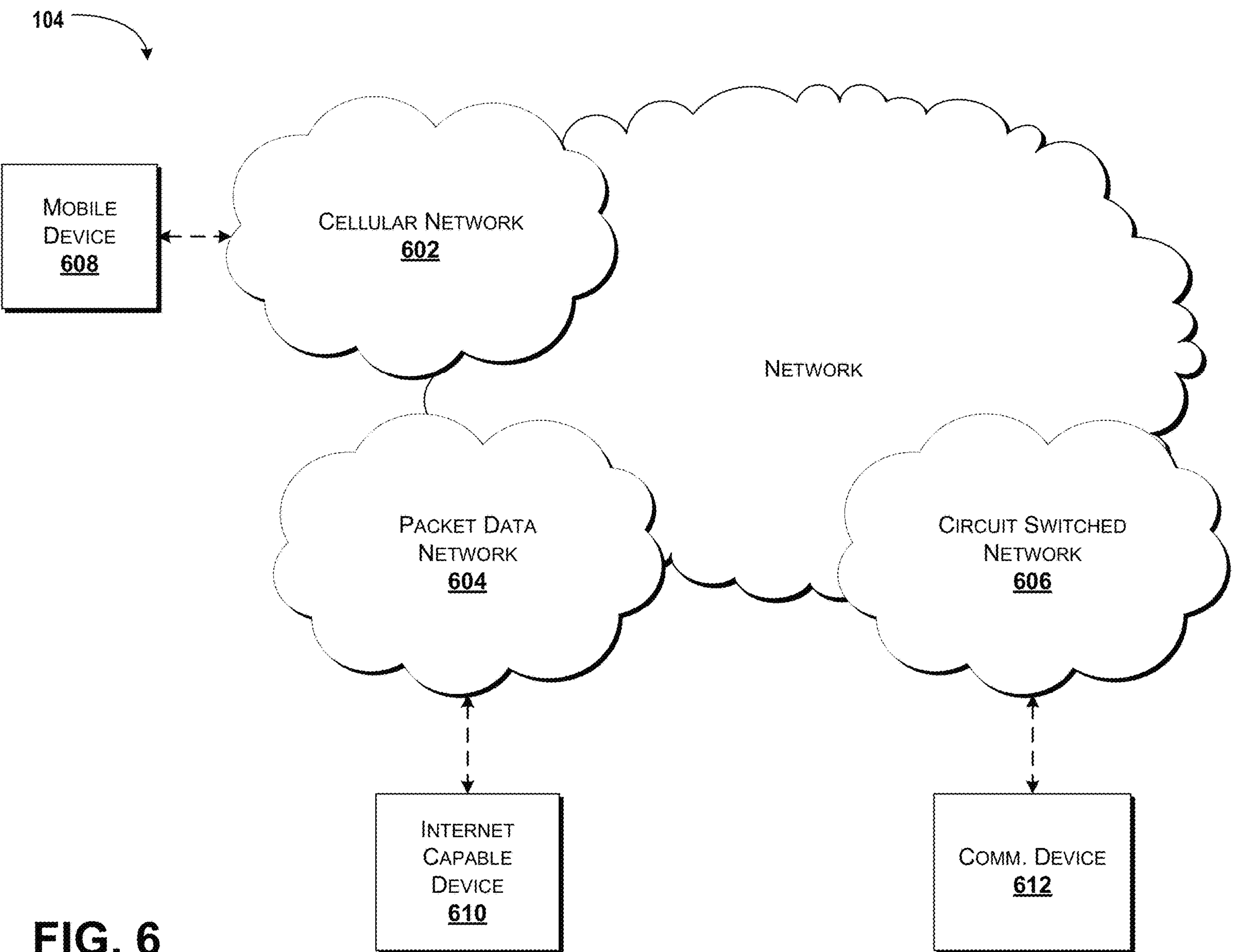
FIG. 6 schematically illustrates a network, according to an illustrative embodiment of the concepts and technologies described herein.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSDPA), and HSPA+. The cellular network 602 also is compatible with 4G mobile communications standards as well as evolved and future mobile standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
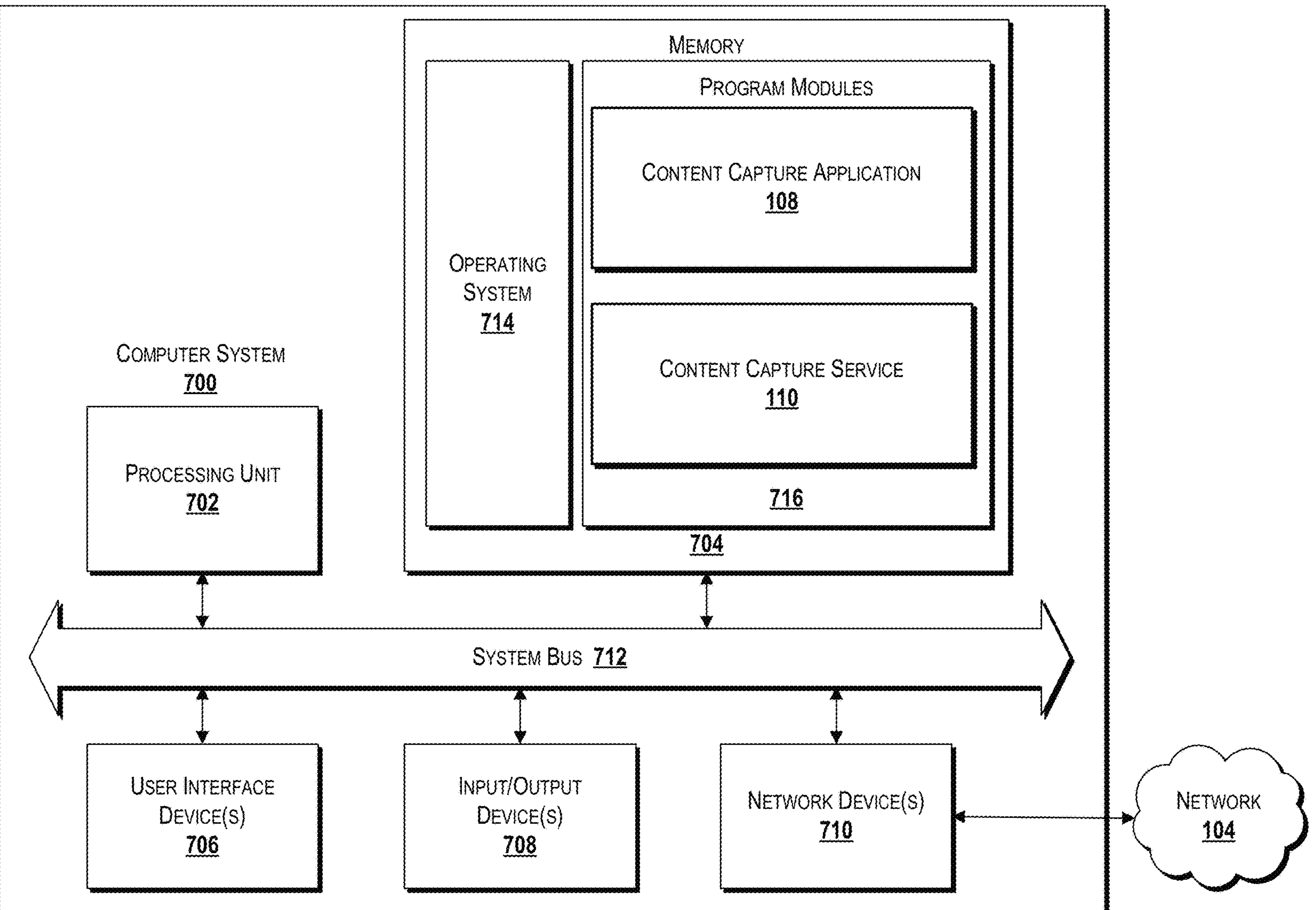
FIG. 7 is a block diagram illustrating an example computer system configured to provide a content capture service, according to some illustrative embodiments of the concepts and technologies described herein.

FIG. 7 is a block diagram illustrating a computer system 700 configured to provide the functionality described herein for a content capture service, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 include the content capture application 108 and the content capture service 110. These and/or other programs can be embodied in computer-readable media containing instructions that, when executed by the processing unit 702, perform one or more of the methods 200, 300, and 400 described in detail above with respect to FIGS. 2-4 and/or other functionality as illustrated and described herein. It can be appreciated that, at least by virtue of the instructions embodying the methods 200, 300, and 400, and/or other functionality illustrated and described herein being stored in the memory 704 and/or accessed and/or executed by the processing unit 702, the computer system 700 is a special-purpose computing system that can facilitate providing the functionality illustrated and described herein. According to embodiments, the program modules 716 may be embodied in hardware, software, firmware, or any combination thereof. Although not shown in FIG. 7, it should be understood that the memory 704 also can be configured to store the project data 114 and/or one or more portions thereof such as the project definitions 116, the project definition data 118, the device capabilities 120, the capture suggestions 122, the user input data 124, the media content 126, the modified media content 128, the other information 130, the project 136, the network data 142, the device table 144, and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 8:
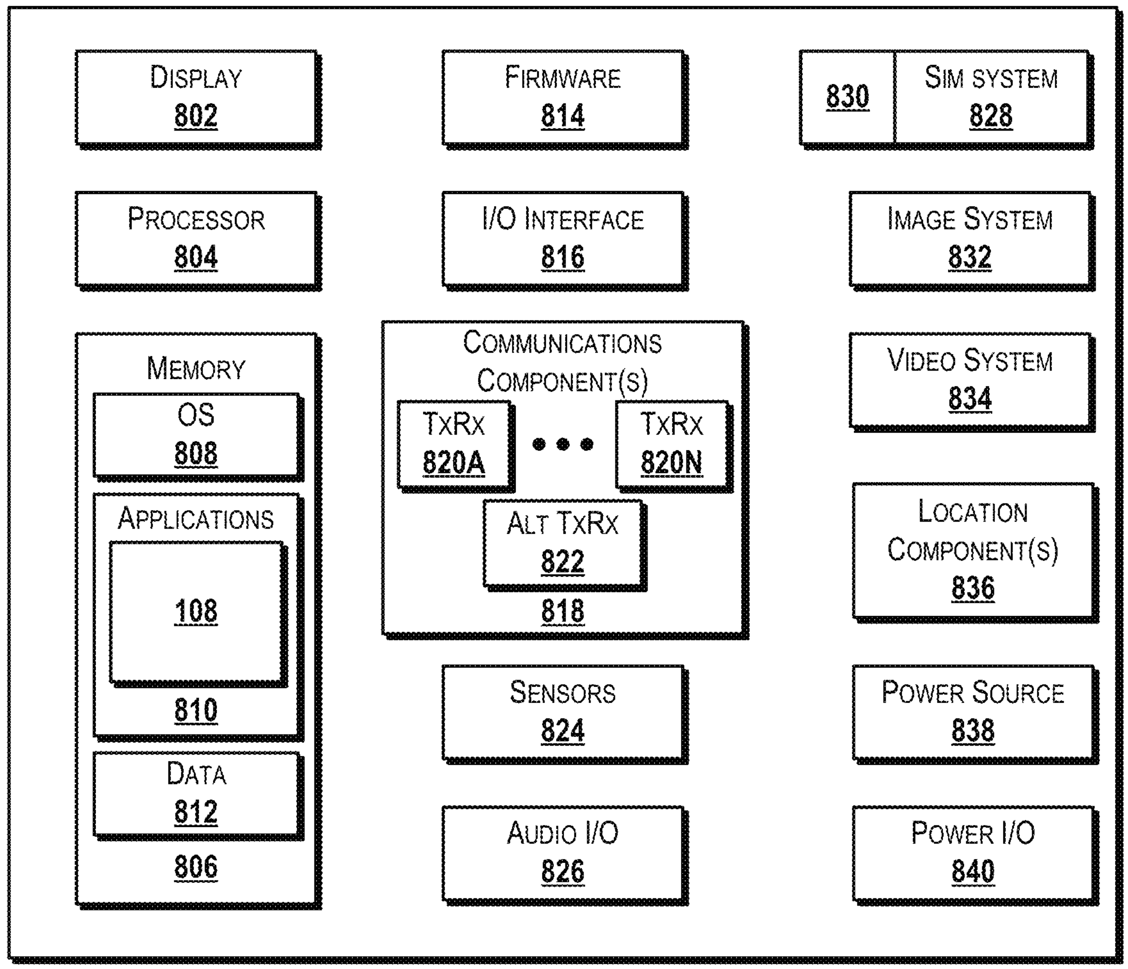
FIG. 8 is a block diagram illustrating an example mobile device configured to interact with and/or provide a content capture service, according to some illustrative embodiments of the concepts and technologies described herein.

Turning now to FIG. 8, an illustrative mobile device 800 and components thereof will be described. In some embodiments, the user device 102 described above with reference to FIGS. 1-5L can be configured as and/or can have an architecture similar or identical to the mobile device 800 described herein in FIG. 8. It should be understood, however, that the user device 102 may or may not include the functionality described herein with reference to FIG. 8. While connections are not shown between the various components illustrated in FIG. 8, it should be understood that some, none, or all of the components illustrated in FIG. 8 can be configured to interact with one another to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements such as, for example, a video capture application, project data 114, project definitions 116 and/or project definition data 118, device capabilities 120 (e.g., baseline recommendations and/or modified baseline recommendations), capture suggestions 122, user input data 124, media content 126, modified media content 128, other information 130, a project 136, network data 142, a device table 144, text, images, video, virtual keypads and/or keyboards, messaging data, notification messages, metadata, internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810 such as the content capture application 108 and/or the content capture service 110, other computer-executable instructions stored in a memory 806, or the like. In some embodiments, the applications 810 also can include a UI application (not illustrated in FIG. 8).

The UI application can interface with the operating system 808, such as the operating system 106 shown in FIG. 1, to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, inputting project definitions 116 and/or project definition data 118, obtaining and/or modifying device capabilities 120, surfacing capture suggestions 122, obtaining user input data 124, capturing and/or viewing media content 126, viewing modified media content 128, obtaining, modifying, and/or viewing other information 130, viewing a project 136, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800. The data 812 can include, for example, the content capture application 108 and/or the content capture service 110, functionality for providing a network monitor 140, and/or other applications or program modules. According to various embodiments, the data 812 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804.

It can be appreciated that, at least by virtue of storage of the instructions corresponding to the applications 810 and/or other instructions embodying other functionality illustrated and described herein in the memory 806, and/or by virtue of the instructions corresponding to the applications 810 and/or other instructions embodying other functionality illustrated and described herein being accessed and/or executed by the processor 804, the mobile device 800 is a special-purpose mobile device that can facilitate providing the functionality illustrated and described herein. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, budget information, network data 142, a device table 144, user information, organization information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the network 104 described herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMAONE, CDMA2000, LTE, and various other 2G, 2.5G, 3G, 4G, 5G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSDPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Figure 9:
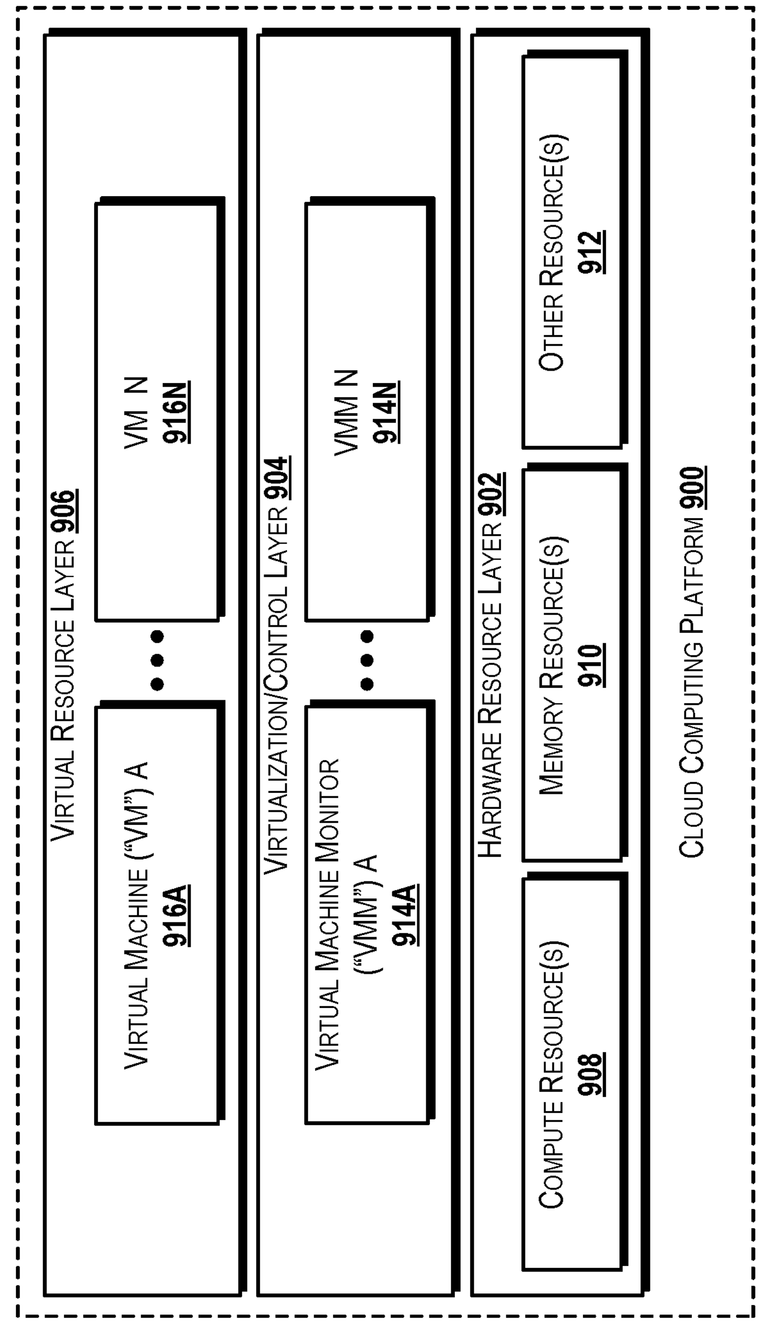
FIG. 9 is a diagram illustrating a computing environment capable of implementing aspects of the concepts and technologies disclosed herein, according to some illustrative embodiments of the concepts and technologies described herein.

FIG. 9 illustrates an illustrative cloud computing platform 900 capable of executing the software components described herein for providing and/or for interacting with the content capture application 108 and/or the content capture service 110. Thus, it can be appreciated that in some embodiments of the concepts and technologies disclosed herein, the cloud computing platform 900 illustrated in FIG. 9 can be used to provide the functionality described herein with respect to the user device 102, the server computer 112, the network monitor 140, and/or the device table 144.

The cloud computing platform 900 thus may be utilized to execute any aspects of the software components presented herein. Thus, according to various embodiments of the concepts and technologies disclosed herein, the content capture application 108 and/or the content capture service 110 can be implemented, at least in part, on or by elements included in the cloud computing platform 900 illustrated and described herein. Those skilled in the art will appreciate that the illustrated cloud computing platform 900 is a simplification of but only one possible implementation of an illustrative cloud computing platform, and as such, the cloud computing platform 900 should not be construed as being limiting in any way.

In the illustrated embodiment, the cloud computing platform 900 can include a hardware resource layer 902, a virtualization/control layer 904, and a virtual resource layer 906. These layers and/or other layers can be configured to cooperate with each other and/or other elements of the cloud computing platform 900 to perform operations as will be described in detail herein. While connections are shown between some of the components illustrated in FIG. 9, it should be understood that some, none, or all of the components illustrated in FIG. 9 can be configured to interact with one another to carry out various functions described herein. In some embodiments, the components are arranged so as to communicate via one or more networks such as, for example, the network 104 illustrated and described hereinabove (not shown in FIG. 9). Thus, it should be understood that FIG. 9 and the following description are intended to provide a general understanding of a suitable environment in which various aspects of embodiments can be implemented, and should not be construed as being limiting in any way.

The hardware resource layer 902 can provide hardware resources. In the illustrated embodiment, the hardware resources can include one or more compute resources 908, one or more memory resources 910, and one or more other resources 912. The compute resource(s) 906 can include one or more hardware components that can perform computations to process data, and/or to execute computer-executable instructions of one or more application programs, operating systems, services, and/or other software including, but not limited to, the content capture application 108 and/or the content capture service 110 illustrated and described herein.

According to various embodiments, the compute resources 908 can include one or more central processing units ("CPUs"). The CPUs can be configured with one or more processing cores. In some embodiments, the compute resources 908 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 908 can include one or more discrete GPUs. In some other embodiments, the compute resources 908 can include one or more CPU and/or GPU components that can be configured in accordance with a co-processing CPU/GPU computing model. Thus, it can be appreciated that in some embodiments of the compute resources 908, a sequential part of an application can execute on a CPU and a computationally-intensive part of the application can be accelerated by the GPU. It should be understood that this example is illustrative, and therefore should not be construed as being limiting in any way.

In some embodiments, the compute resources 908 also can include one or more system on a chip ("SoC") components. It should be understood that the SoC component can operate in association with one or more other components as illustrated and described herein, for example, one or more of the memory resources 910 and/or one or more of the other resources 912. In some embodiments in which an SoC component is included, the compute resources 908 can be or can include one or more embodiments of the SNAPDRAGON brand family of SoCs, available from QUALCOMM of San Diego, Calif.; one or more embodiment of the TEGRA brand family of SoCs, available from NVIDIA of Santa Clara, Calif.; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Tex.; one or more customized versions of any of the above SoCs; and/or one or more other brand and/or one or more proprietary SoCs.

The compute resources 908 can be or can include one or more hardware components that can be arranged in accordance with an ARM architecture, available for license from ARM HOLDINGS of Cambridge, United Kingdom. Alternatively, the compute resources 908 can be or can include one or more hardware components that can be arranged in accordance with an x86 architecture, such as an architecture available from INTEL CORPORATION of Mountain View, Calif., and others. Those skilled in the art will appreciate the implementation of the compute resources 908 can utilize various computation architectures and/or processing architectures. As such, the various example embodiments of the compute resources 908 as mentioned hereinabove should not be construed as being limiting in any way. Rather, implementations of embodiments of the concepts and technologies disclosed herein can be implemented using compute resources 908 having any of the particular computation architecture and/or combination of computation architectures mentioned herein as well as other architectures.

Although not separately illustrated in FIG. 9, it should be understood that the compute resources 908 illustrated and described herein can host and/or execute various services, applications, portals, and/or other functionality illustrated and described herein. Thus, the compute resources 908 can host and/or can execute the content capture application 108, the content capture service 110, or other applications or services illustrated and described herein.

The memory resource(s) 910 can include one or more hardware components that can perform or provide storage operations, including temporary and/or permanent storage operations. In some embodiments, the memory resource(s) 910 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 908, subject to the definition of "computer storage media" provided above (e.g., as excluding waves and signals per se and/or communication media as defined in this application).

Although not illustrated in FIG. 9, it should be understood that the memory resources 910 can host or store the various data illustrated and described herein including, but not limited to, the project data 114 (e.g., one or more portions thereof such as the project definitions 116, the project definition data 118, the device capabilities 120, the capture suggestions 122, the user input data 124, the media content 126, the modified media content 128, the other information 130), the project 136, the network data 142, the device table 144, and/or other data, if desired. It should be understood that this example is illustrative, and therefore should not be construed as being limiting in any way.

The other resource(s) 912 can include any other hardware resources that can be utilized by the compute resources(s) 906 and/or the memory resource(s) 910 to perform operations. The other resource(s) 912 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 902 can be virtualized by one or more virtual machine monitors ("VMMs") 914A-914K (also known as "hypervisors;" hereinafter "VMMs 914"). The VMMs 914 can operate within the virtualization/control layer 904 to manage one or more virtual resources that can reside in the virtual resource layer 906. The VMMs 914 can be or can include software, firmware, and/or hardware that alone or in combination with other software, firmware, and/or hardware, can manage one or more virtual resources operating within the virtual resource layer 906.

The virtual resources operating within the virtual resource layer 906 can include abstractions of at least a portion of the compute resources 908, the memory resources 910, the other resources 912, or any combination thereof. These abstractions are referred to herein as virtual machines ("VMs"). In the illustrated embodiment, the virtual resource layer 906 includes VMs 916A-916N (hereinafter "VMs 916").

According to various embodiments of the concepts and technologies disclosed herein, various use cases and/or benefits are contemplated and/or may be realized. For example, capture suggestions 122 can be used to inform a user 134 and/or other entity how to capture the media content 126 based on resource availability on a network or device. Similarly, the capture suggestions 122 can instruct a user 134 and/or other entity where to aim the camera to obtain an ideal view. It is contemplated that smart devices in the future can be used to automatically aim the camera based on the capture suggestions 122 (e.g., the panning or zooming illustrated and described herein can be automatically implemented by a smart tripod or drone device, for example).

In some embodiments, audio information also can be used. For example, the capture suggestions 122 can inform a user 134 and/or other entity that an ambient noise level at or near the capture device will interfere with capture of audio for the media content 126. The ambient noise can be removed and/or the user 134 and/or other entity can be informed regarding the audio levels so remedial action can be taken during capture of the media content 126. In some embodiments, the capture suggestions 122 can also provide contextual alerts such as, for example, detecting out-of-place objects in a captured scene and alerting the user 134 and/or other entity regarding this object (e.g., a car driving by a reenactment of an historical event, etc.). It should be understood that these examples are illustrative, and therefore should not be construed as being limiting in any way.

In some embodiments, the user 134 or other entity can specify a target for the media content 126 and the content capture service 110 and/or content capture application 108 can be configured to track that target (object or person) and provide visual cues (e.g., overlays 550) to help the user 134 and/or other entity keep that object in focus. It should be understood that this example is illustrative, and therefore should not be construed as being limiting in any way. In some other embodiments, the concepts and technologies disclosed herein can be used to detect insertion points for advertisements using contextual analysis (e.g., detecting an empty wall behind an actor and suggesting placement of an advertisement on the wall). It should be understood that this example is illustrative, and therefore should not be construed as being limiting in any way.

Based on the foregoing, it should be appreciated that systems and methods for providing a content capture service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A device comprising:

a processor; and a memory that stores computer-executable instructions that, when executed by the processor, cause the processor to perform operations comprising:

determining a project definition for a media project, the media project comprising a video that is to be captured via a user device comprising a camera, determining a device capability of the user device, the device capability comprising a video capability and a networking capability, determining, based on the project definition and the device capability, a capture suggestion, wherein the capture suggestion comprises instructions relating to content to be included in the video, providing the capture suggestion to the user device, obtaining media content based on the video, assembling the media project comprising the media content, and outputting the media project to a recipient.

2. The device of claim 1, wherein determining the device capability comprises:

identifying the user device;

identifying a connection statistic for a communication channel that is expected to be used for delivery of the media project; and determining a baseline recommendation based on an identity of the user device and the connection statistic.

3. The device of claim 1, wherein determining the device capability comprises:

determining a capability of the camera, the capability of the camera comprising a frame rate and a resolution; and determining a baseline recommendation based on the capability of the camera.

4. The device of claim 1, wherein the capture suggestion is delivered to a display of the user device.

5. The device of claim 4, wherein the capture suggestion comprises a suggestion to zoom the camera, to crop a scene, or to change an aim of the camera.

6. A method comprising:

determining, at a device comprising a processor, a project definition for a media project, the media project comprising a video that is to be captured via a user device comprising a camera;

determining, by the processor, a device capability of the user device, the device capability comprising a video capability and a networking capability;

determining, by the processor and based on the project definition and the device capability, a capture suggestion, wherein the capture suggestion comprises instructions relating to content to be included in the video;

providing, by the processor, the capture suggestion to the user device;

obtaining, by the processor, media content based on the video;

assembling, by the processor, the media project comprising the media content; and outputting, by the processor, the media project to a recipient.

7. The method of claim 6, wherein determining the project definition comprises:

determining a location at which the video is to be captured.

8. The method of claim 6, wherein determining the project definition comprises:

obtaining a text that is to be represented in the video.

9. The method of claim 6, wherein determining the project definition comprises:

obtaining a budget that capture of the video must satisfy.

10. The method of claim 9, wherein the budget comprises a time budget comprising a time range between a minimum time and a maximum time, and wherein the capture suggestion represents a remaining portion of the time budget.

11. The method of claim 6, wherein determining the device capability comprises:

identifying the user device;

identifying a connection statistic for a communication channel that is expected to be used for delivery of the media project; and determining a baseline recommendation based on an identity of the user device and the connection statistic.

12. The method of claim 6, wherein determining the device capability comprises:

determining a capability of the camera, the capability of the camera comprising a frame rate and a resolution; and determining a baseline recommendation based on the capability of the camera.

13. The method of claim 12, wherein determining the device capability further comprises:

delivering the baseline recommendation to the user device; and modifying the baseline recommendation based on input via the user device.

14. The method of claim 6, wherein the capture suggestion is delivered to a display of the user device.

15. The method of claim 14, wherein the capture suggestion comprises a suggestion to zoom the camera, to crop a scene, or to change an aim of the camera.

16. The method of claim 14, wherein the capture suggestion comprises an indication of a budget remaining.

17. The method of claim 8, wherein the capture suggestion is delivered to a display of the user device, and wherein the capture suggestion comprises a suggestion to capture a spoken word in the video, wherein the spoken word is based on the text.

18. A computer storage medium having computer-executable instructions stored thereon that, when executed by a processor, cause the processor to perform operations comprising:

determining a project definition for a media project, the media project comprising a video that is to be captured via a user device comprising a camera;

determining a device capability of the user device, the device capability comprising a video capability and a networking capability;

determining, based on the project definition and the device capability, a capture suggestion, wherein the capture suggestion comprises instructions relating to content to be included in the video;

providing the capture suggestion to the user device;

obtaining media content based on the video;

assembling the media project comprising the media content; and outputting the media project to a recipient.

19. The computer storage medium of claim 18, wherein determining the device capability comprises:

identifying the user device;

identifying a connection statistic for a communication channel that is expected to be used for delivery of the media project;

determining a capability of the camera, the capability of the camera comprising a frame rate and a resolution; and determining a baseline recommendation based on an identity of the user device, the connection statistic, and the capability of the camera.

20. The computer storage medium of claim 18, wherein the capture suggestion is delivered to a display of the user device, and wherein the capture suggestion comprises a suggestion to zoom the camera, to crop a scene, or to change an aim of the camera.

* * * * *